United States Patent
Koito et al.

(10) Patent No.: US 10,816,818 B2
(45) Date of Patent: Oct. 27, 2020

(54) DISPLAY DEVICE

(71) Applicant: Japan Display Inc., Minato-ku (JP)

(72) Inventors: Takeo Koito, Tokyo (JP); Shuji Hayashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/415,267

(22) Filed: May 17, 2019

(65) Prior Publication Data

US 2019/0353916 A1   Nov. 21, 2019

(30) Foreign Application Priority Data

May 18, 2018   (JP) .................................. 2018-096348
Jan. 9, 2019   (JP) .................................. 2019-001910

(51) Int. Cl.
*G02B 30/27*   (2020.01)
*G02F 1/1335*   (2006.01)
*G02F 1/1343*   (2006.01)

(52) U.S. Cl.
CPC ....... *G02B 30/27* (2020.01); *G02F 1/133512* (2013.01); *G02F 1/133526* (2013.01); *G02F 1/134336* (2013.01); *G02F 2001/134345* (2013.01)

(58) Field of Classification Search
CPC ........ G02B 30/26; G02B 30/27; G02B 30/29; G02B 2300/0439; G02B 2300/0452; H04N 13/305; H04N 13/307
See application file for complete search history.

(56) References Cited

U.S. PATENT DOCUMENTS

2017/0110086 A1 *  4/2017  Guo ........................ G09G 3/36
2019/0187484 A1    6/2019  Koito et al.

FOREIGN PATENT DOCUMENTS

| JP | 2013-231745 | 11/2013 |
| JP | 2014-167493 | 9/2014 |

* cited by examiner

*Primary Examiner* — Angela K Davison
(74) *Attorney, Agent, or Firm* — Oblon, McClelland, Maier & Neustadt, L.L.P.

(57) ABSTRACT

According to one embodiment, a display device includes a display portion and a light control element, wherein the display portion includes a pixel group including sub-pixels for displaying an image of L viewpoints, the light control element includes light controllers, the light controllers, the number of which is equal to m, overlap the pixel group, L and m each represent a natural number greater than or equal to 2, the light controller overlaps the sub-pixels, the number of which is equal to P, arranged in a first direction, and P, L, m satisfy the relationship of P=L/3m.

16 Claims, 19 Drawing Sheets

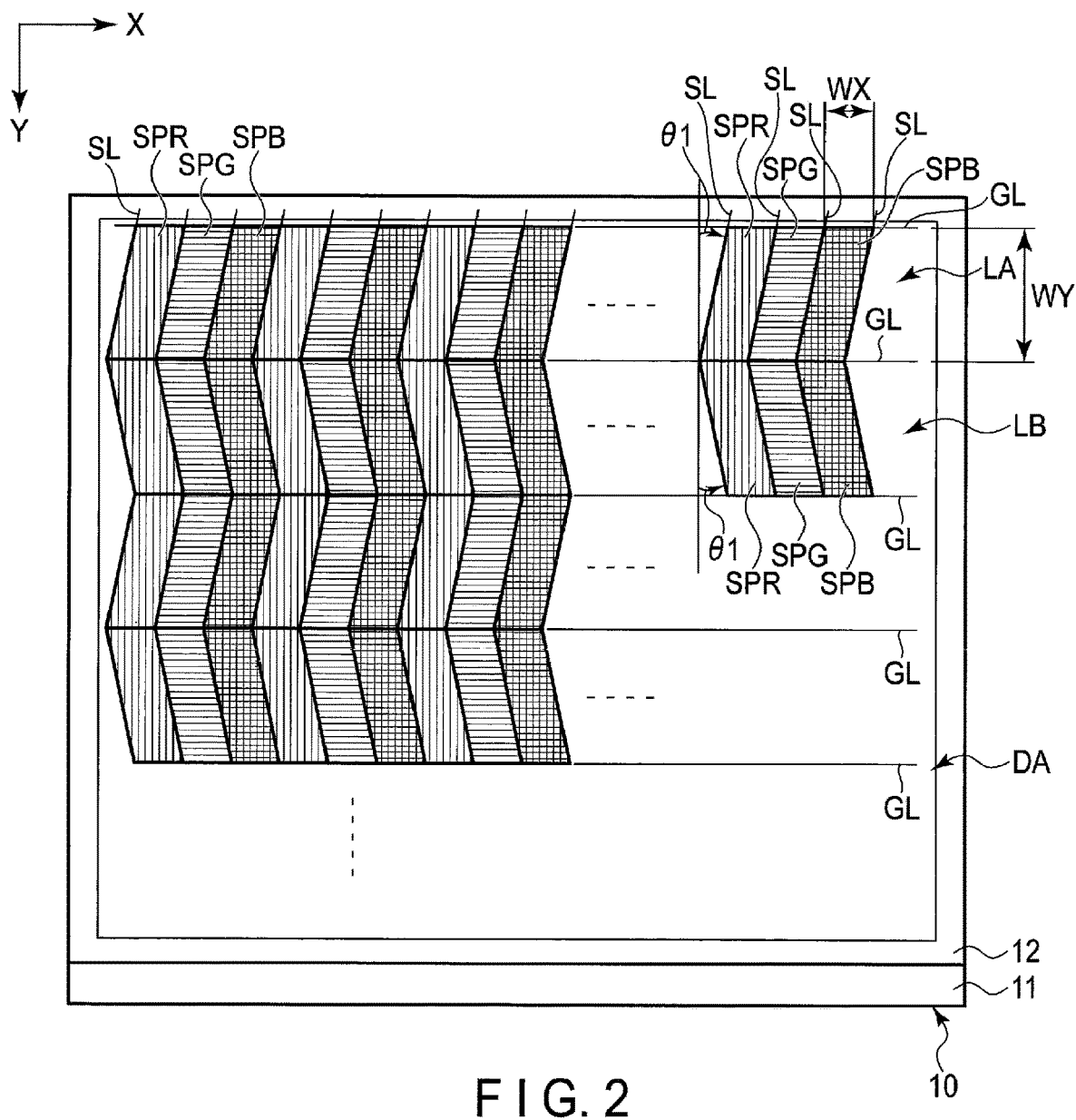
F I G. 2

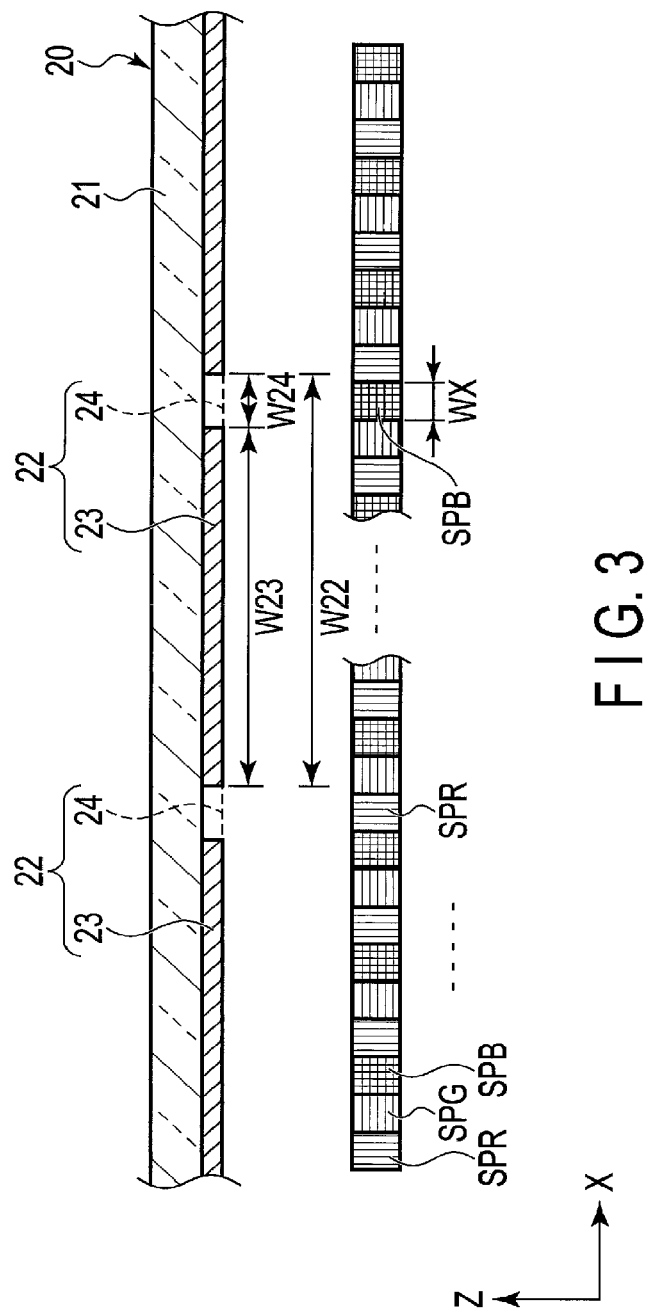
F I G. 3

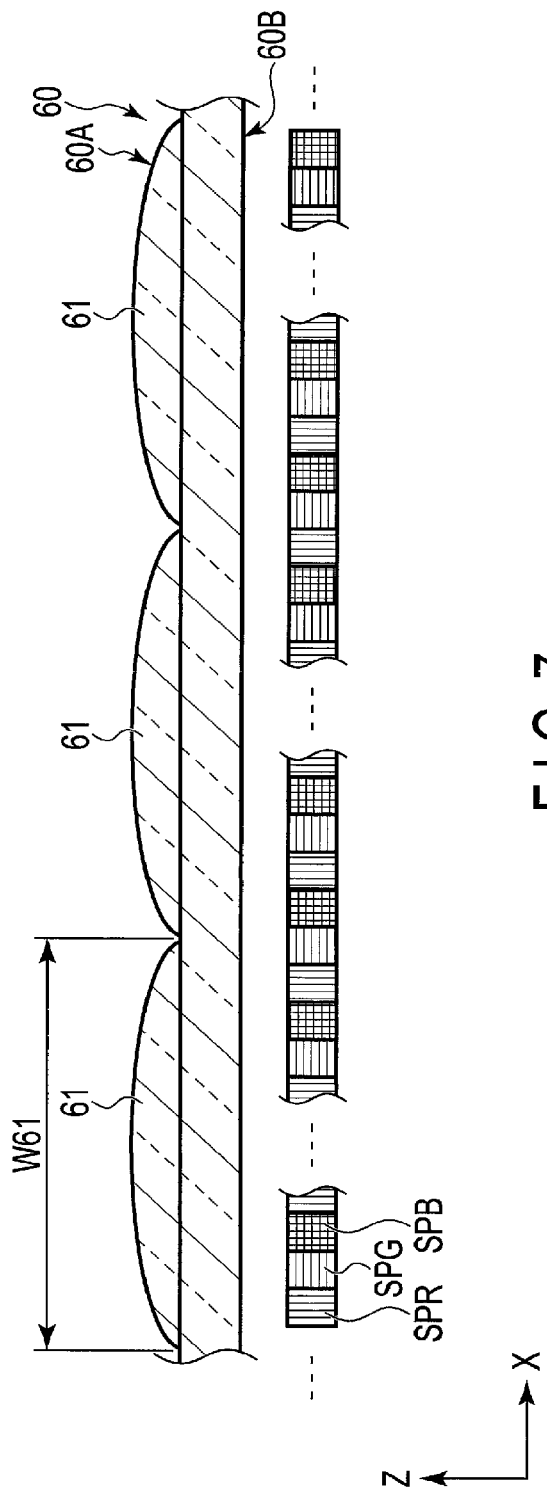
F I G. 7

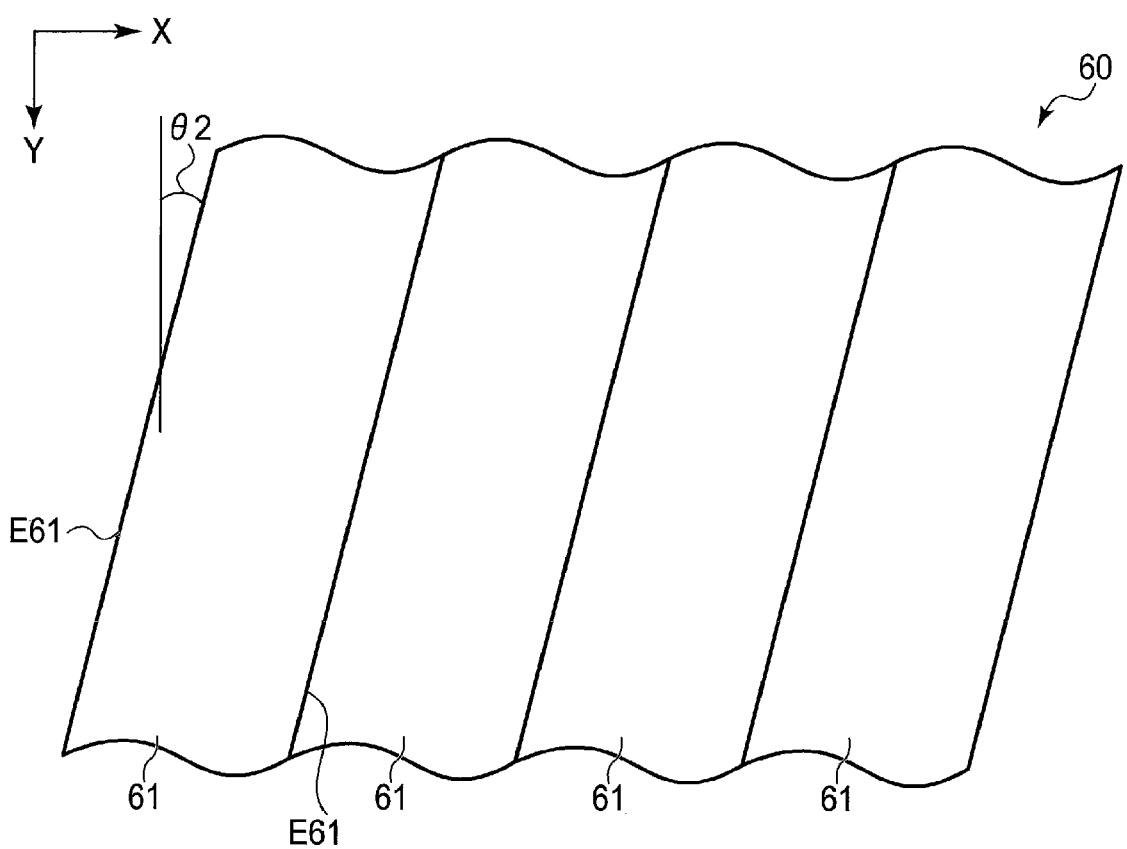
F I G. 8

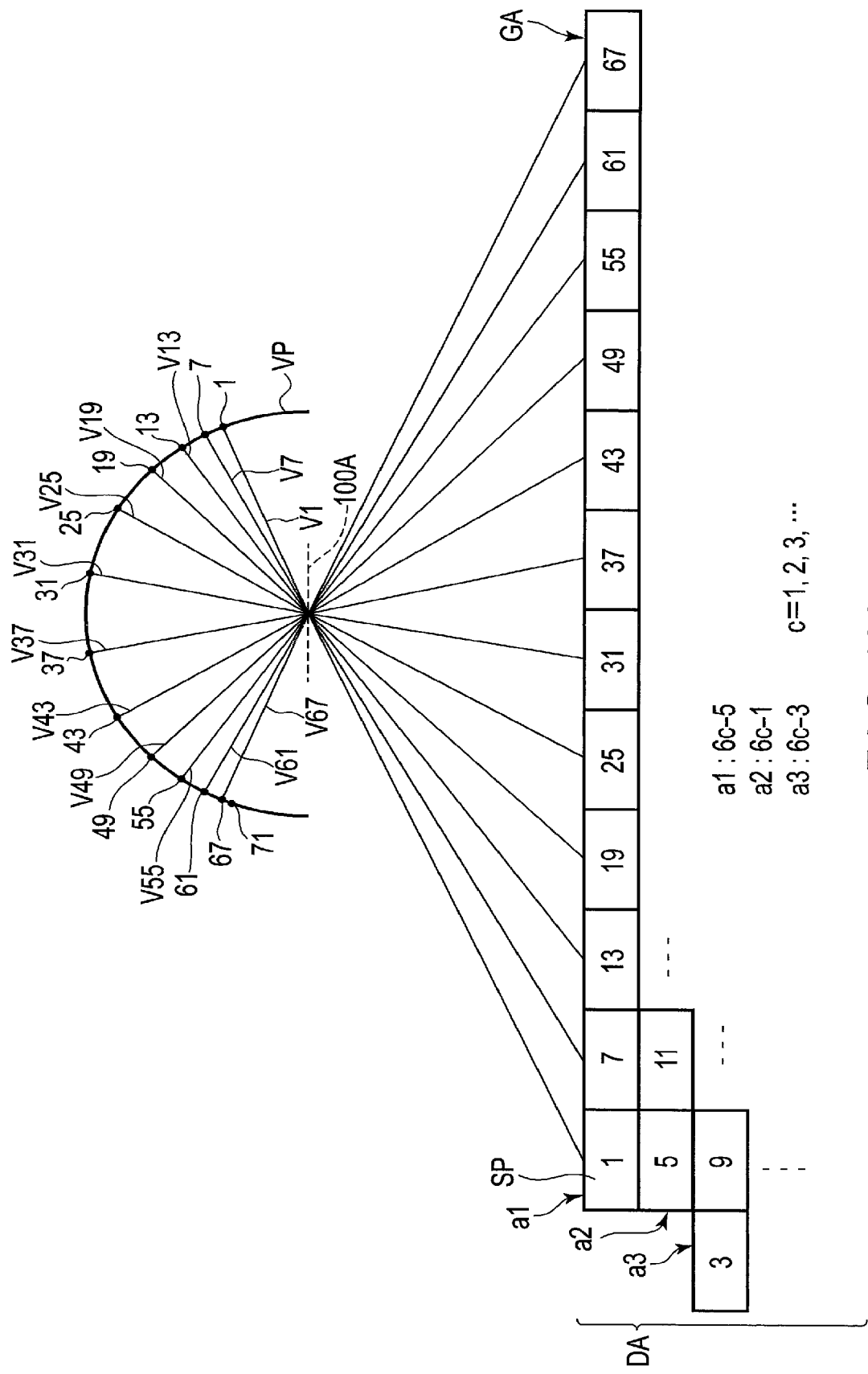

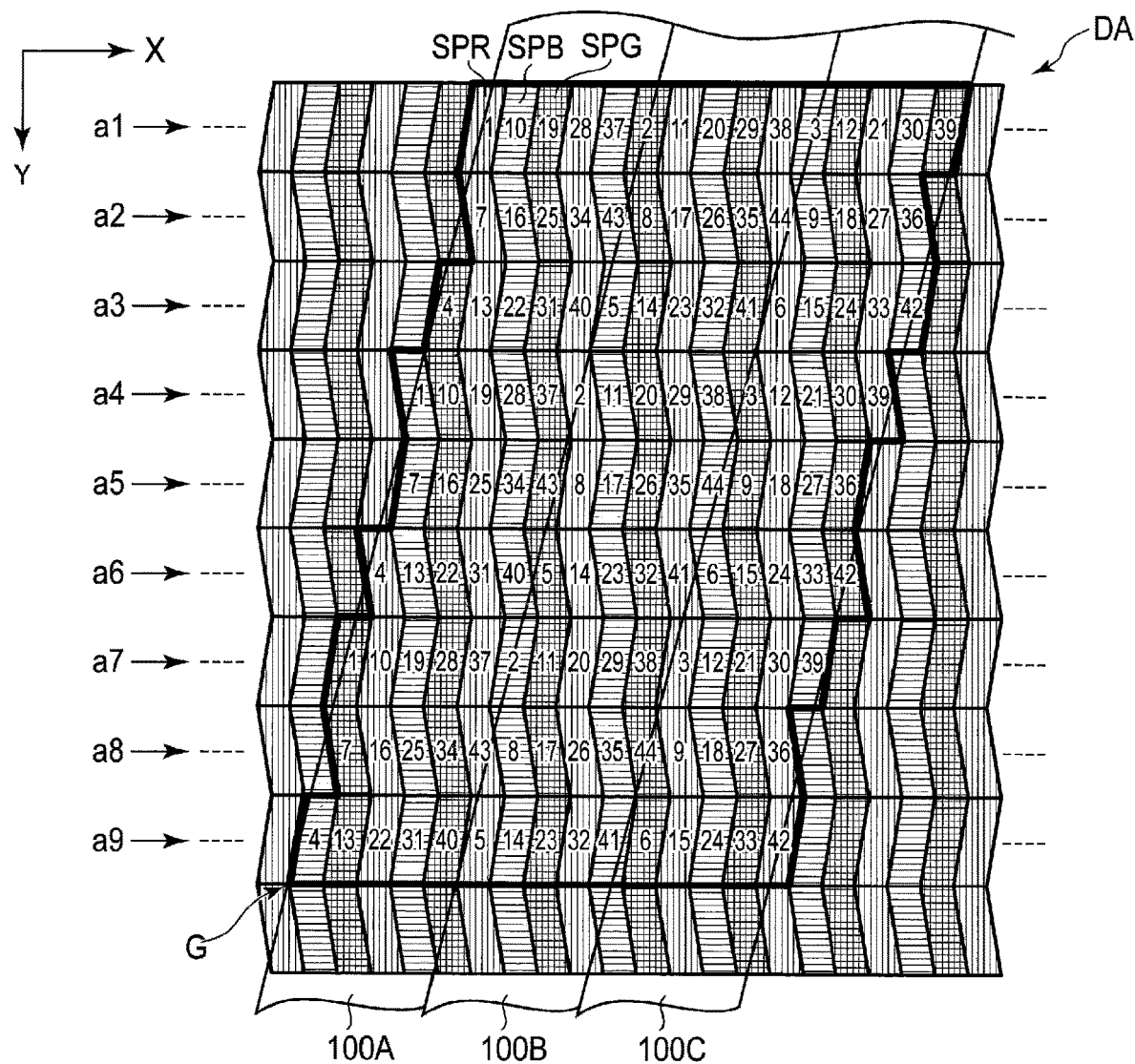
F I G. 14

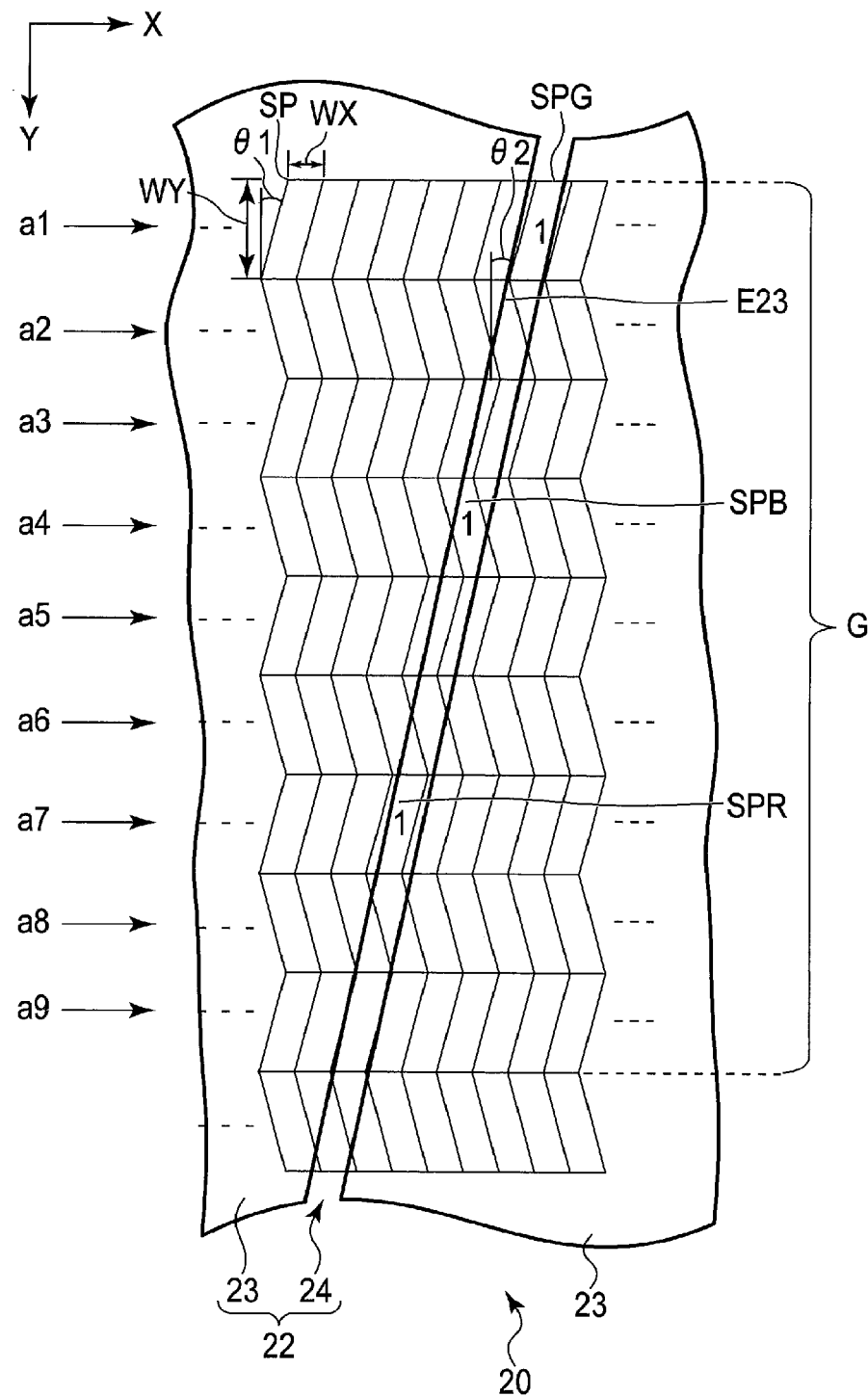
F I G. 15

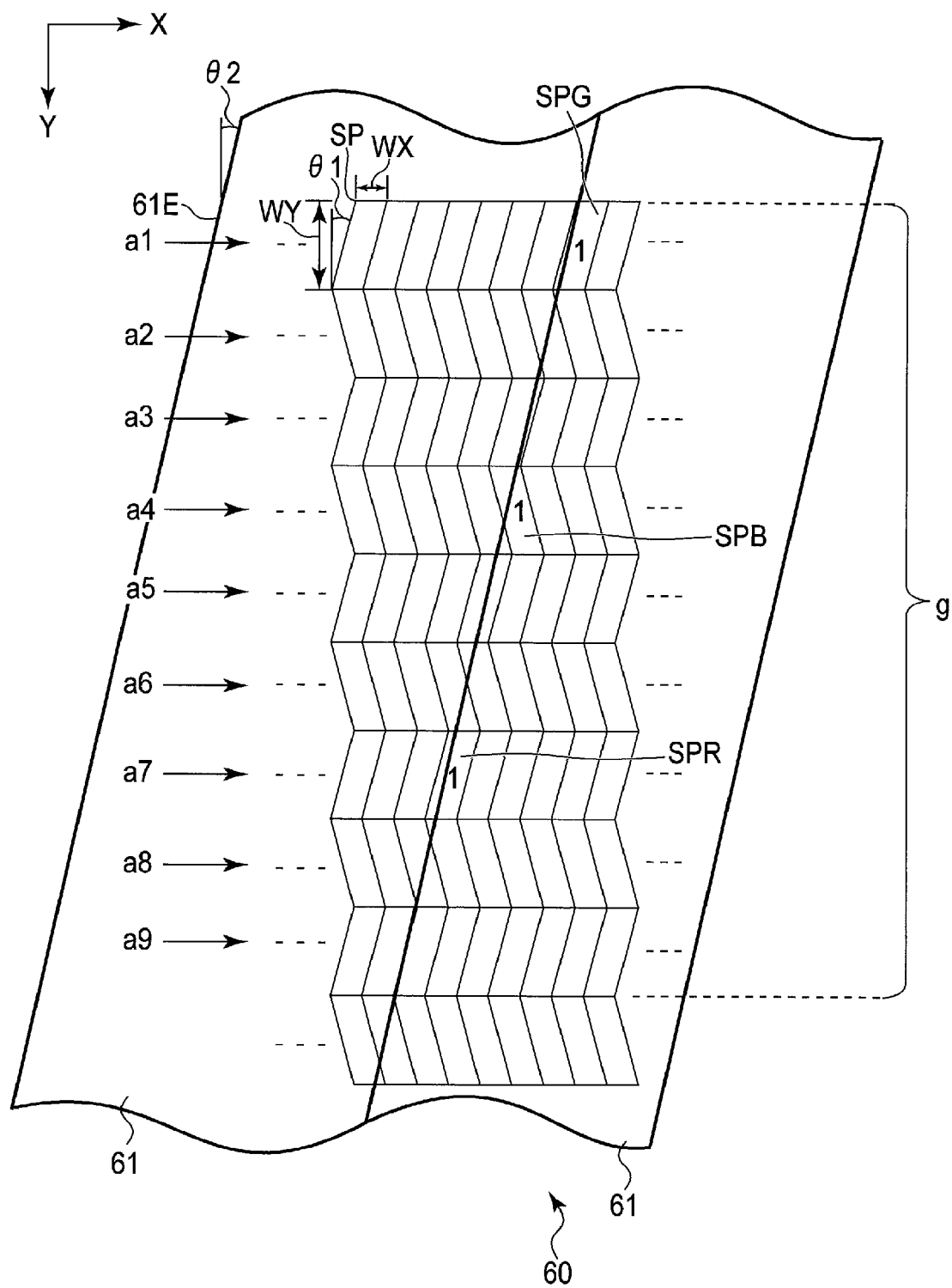
F I G. 16

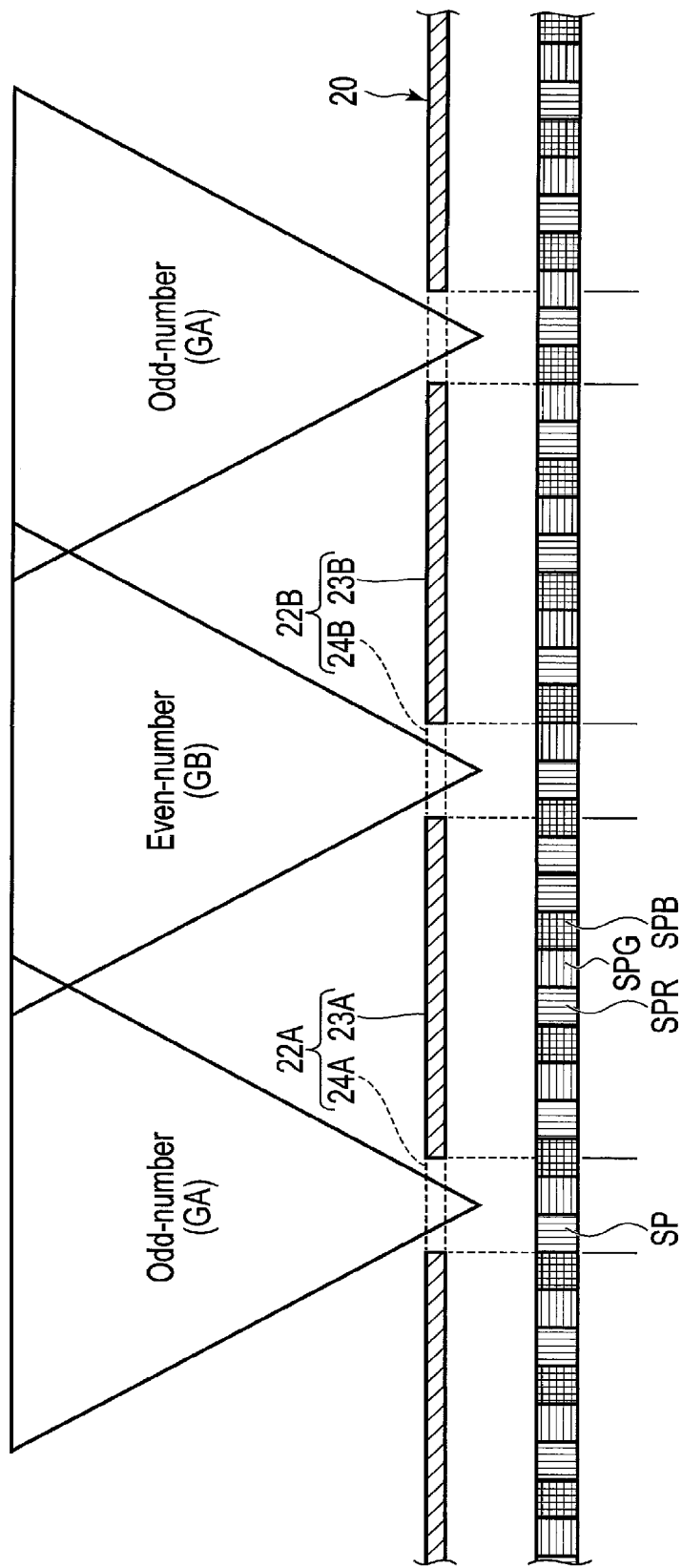
F I G. 18

US 10,816,818 B2
DISPLAY DEVICE

CROSS-REFERENCE TO RELATED APPLICATIONS

This application is based upon and claims the benefit of priority from Japanese Patent Applications No. 2018-096348, filed May 18, 2018; and No. 2019-001910, filed Jan. 9, 2019, the entire contents of all of which are incorporated herein by reference.

FIELD

Embodiments described herein relate generally to a display device.

BACKGROUND

Recently, various types of multi-view display devices which enable images to be seen stereoscopically with the naked eyes have been proposed. In such a display device, there is a demand for achieving more natural stereoscopic view. In one example, a technology in which optical properties of beam control elements, which overlap a display device including sub-pixel groups, are changed at predetermined intervals along a direction equivalent to arc $\tan(1/3)$ relative to a first direction is known. Other than the above, technologies related to lens elements that are inclined at arc $\tan(1/12)$, arc $\tan(1/15)$, and arc $\tan(1/16)$, respectively, are also disclosed.

BRIEF DESCRIPTION OF THE DRAWINGS

FIG. 2 is a plan view showing a configuration example of a display panel 10 shown in FIG. 1.

FIG. 3 is a cross-sectional view showing a configuration example of a light control element 20 shown in FIG. 1.

FIG. 7 is a cross-sectional view showing a configuration example of a light control element 60.

FIG. 8 is a plan view showing a configuration example of the light control element 60.

FIG. 10A is an illustration showing the relationship between a viewpoint in a virtual observation plane VP and a sub-pixel SP to be observed.

FIG. 14 is an illustration showing a fourth example of a layout of the sub-pixels SP in the display portion DA.

FIG. 15 is a plan view showing the sub-pixel SP observed from a viewpoint "1" when a light restriction body 22 is applied as a light controller 100.

FIG. 16 is a plan view showing the sub-pixel SP observed from the viewpoint "1" when a lens 61 is applied as the light controller 100.

FIG. 18 is an illustration showing the state in which the sub-pixel SP is observed via the light restriction body 22 of a first configuration example.

DETAILED DESCRIPTION

Figure 1:
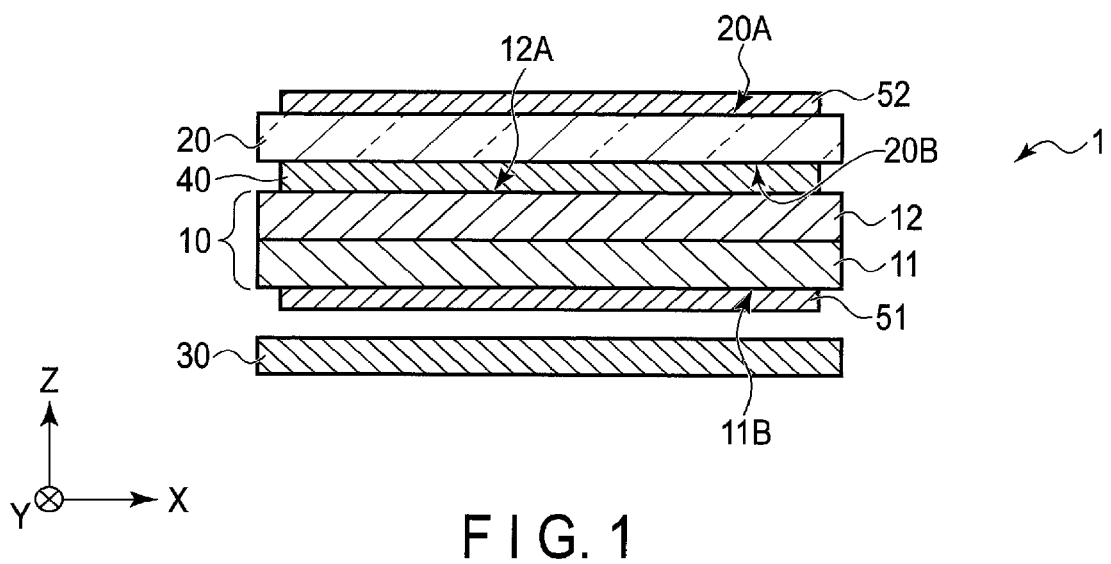
FIG. 1 is a cross-sectional view showing a first configuration example of a display device 1 of the present embodiment.

In general, according to one embodiment, a display device comprises: a display portion comprising sub-pixels arranged in a first direction, and a second direction orthogonal to the first direction; and a light control element overlapping the display portion, wherein the display portion comprises a pixel group comprising the sub-pixels for displaying an image of L viewpoints, the light control element comprises light controllers arranged in the first direction, each of the light controllers extends in an oblique direction different from the first direction and the second direction, the light controllers, the number of which is equal to m, overlap the pixel group, L and m each represent a natural number greater than or equal to 2, the light controller overlaps the sub-pixels, the number of which is equal to P, arranged in the first direction, and P, L, m satisfy the relationship of $P=L/3m$.

Some embodiments will be described hereinafter referring to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and detailed explanations of them that are considered redundant may be arbitrarily omitted.

<<First Configuration Example>>

FIG. 1 is a cross-sectional view showing a first configuration example of a display device 1 of the present embodiment. In the drawing, a first direction X and a second direction Y are orthogonal to each other, and a third direction Z is orthogonal to the first direction X and the second direction Y. The first direction X and the second direction Y correspond to directions parallel to a main surface of a substrate which constitutes the display device 1, and the third direction Z corresponds to a thickness direction of the display device 1. In the present specification, a direction from a first substrate 11 toward a second substrate 12 is referred to as upper (or merely above), and a direction from the second substrate 12 toward the first substrate 11 is referred to as lower (or merely below). When such expressions as "a second member above a first member" and "a second member below a first member" are used, the second member may be in contact with the first member or may be separated from the first member. Further, it is assumed that an observation position at which the display device 1 is observed is at the pointing end side of an arrow indicating the third direction Z, and a view from the observation position toward an X-Y plane defined by the first direction X and the second direction Y is called a planar view.

The display device 1 comprises a display panel 10, a light control element 20, and an illumination device 30. The display panel 10 is, for example, a liquid crystal display panel. The display panel 10 includes the first substrate 11 and the second substrate 12. The second substrate 12 is located above the first substrate 11. The light control element 20 is located above the display panel 10. The light control element 20 comprises a plurality of light controllers, which will be described in detail later. The light control element 20 is fixed to the display panel 10 by a transparent resin 40. The illumination device 30 is located below the display panel 10. A first polarizer 51 is bonded to a lower surface 11B of the first substrate 11. A second polarizer 52 is bonded to an upper surface 20A of the light control element 20.

The second polarizer 52 may be bonded to an upper surface 12A of the second substrate 12, or may be bonded to a lower surface 20B of the light control element 20. Alternatively, the light control element 20 may be located between the first polarizer 51 and the first substrate 11, or between the illumination device 30 and the first polarizer 51. Further, the light control element 20 may be incorporated in the display panel 10.

Note that the display panel 10 is not limited to a liquid crystal panel, and may be a self-luminous display panel including organic electroluminescent elements, μLEDs, and the like, or an electronic paper display panel including cataphoretic elements, etc.

The display panel 10 is a transmissive display panel which displays an image by selectively passing light from a rear surface of the first substrate 11, for example. Note that the display panel 10 may be a reflective display panel which displays an image by selectively reflecting light from a front surface of the second substrate 12, or a display panel having the transmissive display function and the reflective display function. When the display panel 10 is a reflective display panel, the illumination device 30 may be omitted, or the illumination device 30 may be located above the display panel 10.

FIG. 2 is a plan view showing a configuration example of the display panel 10 shown in FIG. 1. The display panel 10 includes a display portion DA at a portion where the first substrate 11 and the second substrate 12 overlap one another as seen in plan view. The display portion DA comprises a plurality of sub-pixels SP arrayed in the first direction X and the second direction Y. In one example, as the sub-pixels SP, the display portion DA comprises a red sub-pixel SPR which displays red, a green sub-pixel SPG which displays green, and a blue sub-pixel SPB which displays blue. In FIG. 2, the red sub-pixel SPR is indicated by a pattern of vertical lines parallel to the second direction Y, the green sub-pixel SPG is indicated by a pattern of horizontal lines parallel to the first direction X, and the blue sub-pixel SPB is indicated by a grating pattern. Note that in the following explanation, when the color of the sub-pixel is not particularly referred to, the sub-pixel may simply be indicated as "sub-pixel SP". The first direction X may be referred to as a horizontal direction, and the second direction Y may be referred to as a vertical direction. The sub-pixels SP arranged in the first direction X constitute a "row", and the sub-pixels SP arranged in the second direction Y constitute a "column".

Two sub-pixels SP arranged adjacently in the first direction X correspond to the sub-pixels SP which display colors different from each other. Two sub-pixels SP arranged adjacently in the second direction Y correspond to the sub-pixels which display the same color. In the example illustrated in FIG. 2, the red sub-pixel SPR, the green sub-pixel SPG, and the blue sub-pixel SPB are arranged in this order in the first direction X, and the sub-pixels SP of the same color are arranged in the second direction Y.

Each of the red sub-pixel SPR, the green sub-pixel SPG, and the blue sub-pixel SPB is formed in a parallelogram shape, and is inclined at an angle θ1 of greater than or equal to 4° and less than or equal to 16° relative to the second direction Y. In addition, the red sub-pixel SPR, the green sub-pixel SPG, and the blue sub-pixel SPB each have the same dimension, and have a first width WX along the first direction X, and a second width WY along the second direction Y. The second width WY is greater than the first width WX. The first width WX corresponds to a pitch along the first direction X of the sub-pixel SP, and corresponds to a pitch along the first direction X between adjacent signal lines SL. The second width WY corresponds to a pitch along the second direction Y of the sub-pixel SP, and corresponds to a pitch along the second direction Y between adjacent scanning lines GL.

For example, when the sub-pixels of n colors are arranged in the first direction X, and a set of these n sub-pixels is aligned in the first direction X, the second width WY is n times as great as the first width WX. Here, n represents a natural number greater than or equal to 2. In the example illustrated in FIG. 2, n is 3. Accordingly, the second width WY is approximately three times as great as the first width WX.

In the display portion DA, the sub-pixels SP located in an odd-numbered row LA are inclined in a direction different from that of the sub-pixels SP located in an even-numbered row LB. However, an angle formed between the sub-pixel SP located in the odd-numbered row LA and the second direction Y is equal to an angle formed between the sub-pixel SP located in the even-numbered row LB and the second direction Y.

For example, the sub-pixels SP located in the odd-numbered row LA are all inclined clockwise at the angle θ1 relative to the second direction Y. Meanwhile, the sub-pixels SP located in the even-numbered row LB are all inclined counterclockwise at the angle θ1 relative to the second direction Y. Alternatively, the sub-pixels SP located in the odd-numbered row LA may be inclined counterclockwise at the angle θ1 relative to the second direction Y, and the sub-pixels SP located in the even-numbered row LB may be inclined clockwise at the angle θ1 relative to the second direction Y.

FIG. 3 is a cross-sectional view showing a configuration example of the light control element 20 shown in FIG. 1. The light control element 20 comprises a base 21, and a plurality of light restriction bodies 22. The base 21 is a transparent substrate of glass, resin, or the like. The light restriction body 22 restricts light beams which pass therethrough, and functions as a light controller. In one example, the light restriction body 22 includes a light-shielding body 23 overlapping a plurality of sub-pixels SP arranged in the first direction X, and an opening 24 overlapping at least one sub-pixel SP. In other words, the light-shielding bodies 23 are spaced apart from each other in the first direction X at an interval corresponding to the width of the opening 24.

Preferably, the light-shielding body 23 should have the optical density (OD value) of 3 or more. The light-shielding body 23 may be a light absorber or a light reflector. The light-shielding body 23 may be formed of a metal material such as a compound containing chromium, molybdenum, or silver, or may be formed of a black resin material. In the present embodiment, an emulsion mask is used as the light restriction body 22, for example.

The light-shielding body 23 has a width W23, and the opening 24 has a width W24. Note that the width W23 and the width W24 are a length along the first direction X. A width W22 of a single light restriction body 22, or a pitch of the light restriction bodies 22 arranged in the first direction X, corresponds to the sum of the width W23 and the width W24.

The width W23 is greater than the width W24. In one example, two light restriction bodies 22 arranged in the first direction X overlap twenty-three sub-pixels SP. The openings 24 arranged adjacently in the first direction X overlap the sub-pixels SP of different colors, respectively. For example, the opening 24 located on the left side in FIG. 3 overlaps the red sub-pixel SPR, and the opening 24 located on the right side in FIG. 3 overlaps the blue sub-pixel SPB.

In the example shown in FIG. 3, the width W24 is greater than the first width WX of the sub-pixel SP, but is not limited to this example. The width W24 may be equal to the first width WX, or the width W24 may be less than the first width WX. When the width W24 is less than the first width WX, the number of light beams which pass through the opening 24 can be reduced, whereby the resolution of the image to be visually recognized can be improved. Meanwhile, from the standpoint of suppressing lowering of the brightness of the image to be visually recognized, the width W24 should preferably be substantially equal to the first width WX of at least one sub-pixel. Also, a single opening 24 may overlap a plurality of sub-pixels SP.

Figure 4:
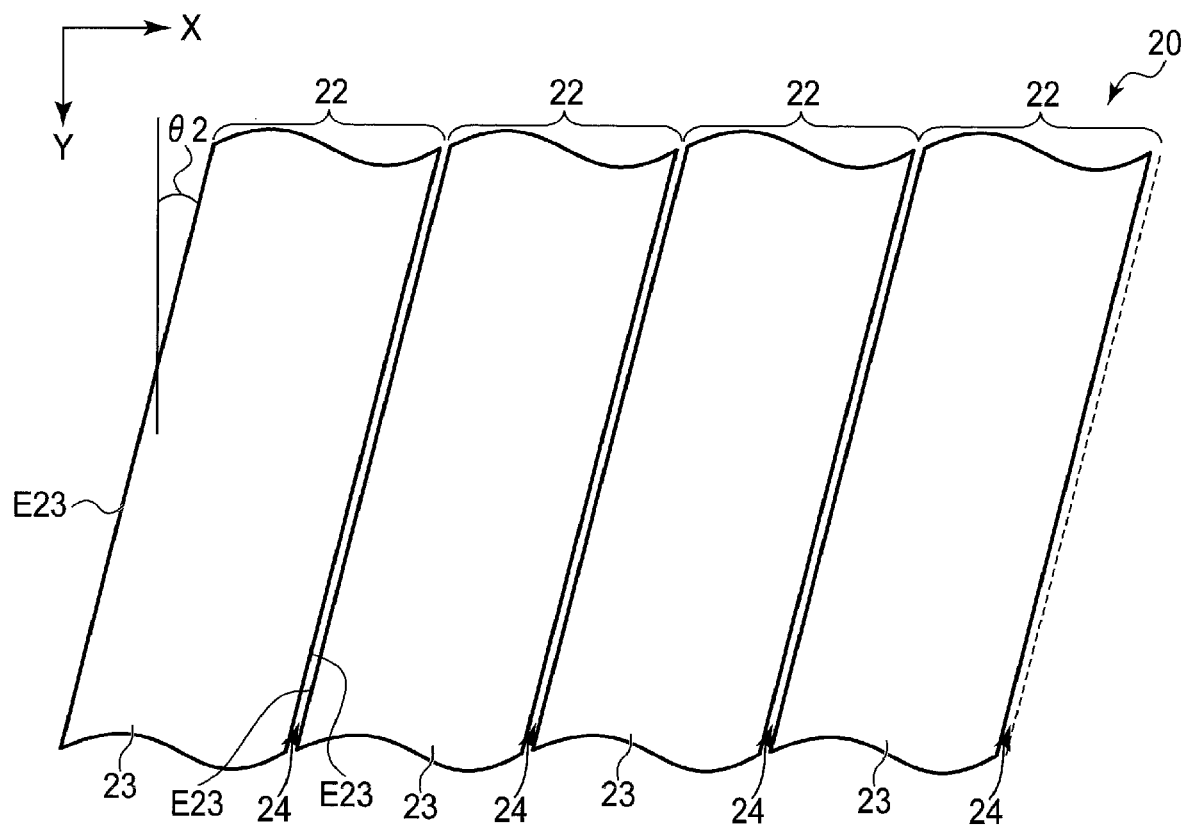
FIG. 4 is a plan view showing a configuration example of the light control element 20 shown in FIG. 3.

FIG. 4 is a plan view showing a configuration example of the light control element 20 shown in FIG. 3. In the light control element 20, the light restriction bodies 22 are arranged in the first direction X. The light-shielding body 23 and the opening 24 which constitute the light restriction body 22 extend in an oblique direction different from the first direction X and the second direction Y. Each of the light-shielding bodies 23 includes a pair of edges E23 arranged in the first direction X. The edges E23 are parallel to each other. The opening 24 is located between the edges E23, which are the mutually facing edges of the light-shielding bodies 23 adjacent to each other in the first direction X.

The light restriction bodies 22 overlap the display portion DA shown in FIG. 2, and linearly extend over the sub-pixels SP located in the odd-numbered row LA and the sub-pixels SP located in the even-numbered row LB. Each of the light restriction body 22, the light-shielding body 23, and the opening 24 is inclined at an angle θ2 relative to the second direction Y. The angle θ2 is smaller than the angle θ1. In the present embodiment, an extending direction of each of the light restriction body 22, the light-shielding body 23, and the opening 24 can be defined as an extending direction of the edges E23. Each of the edges E23 is inclined at the angle θ2, which is substantially equivalent to arc tan(⅔n) relative to the second direction Y. Note that the angle θ2 intended in this specification may be an angle formed clockwise relative to the second direction Y, or may be an angle formed counterclockwise relative to the second direction Y. As described above, n represents a magnification ratio of the second width WY to the first width WX of the sub-pixel SP.

Also, as will be described later, n corresponds to the number of sub-pixels provided in a main pixel for displaying an image of the same viewpoint. In the above example, n is 3, and θ2 is about 12.5°.

<<Second Configuration Example>>

Figure 5:
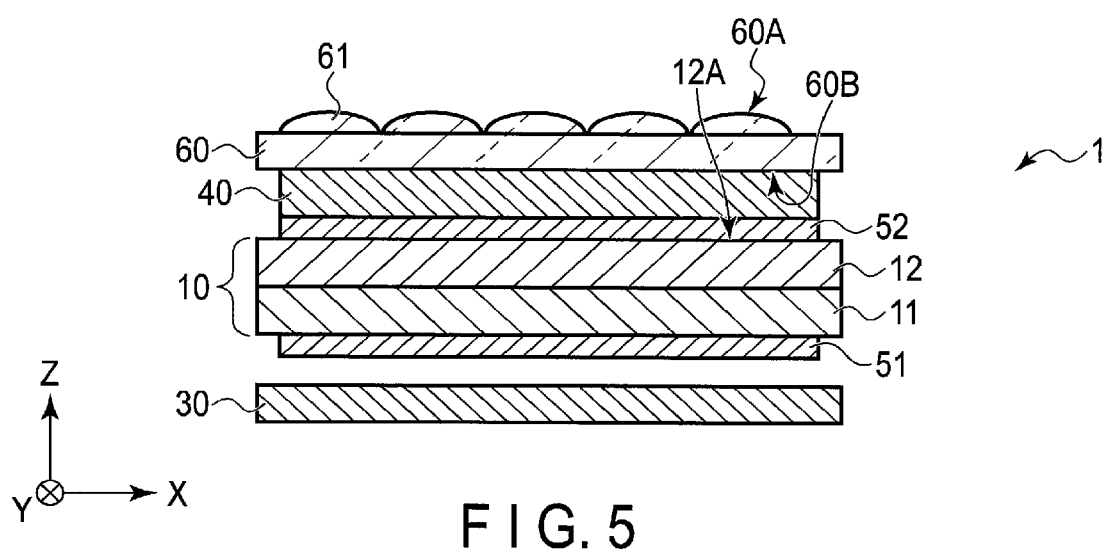
FIG. 5 is a cross-sectional view showing a second configuration example of the display device 1 of the present embodiment.

FIG. 5 is a cross-sectional view showing a second configuration example of the display device 1 of the present embodiment. The display device 1 shown in FIG. 5 comprises a light control element 60 different from the light control element 20 of the display device 1 shown in FIG. 1. The light control element 60 comprises a plurality of lenses 61. The light control element 60 includes a lens surface 60A and a flat surface 60B. The light control element 60 is arranged such that the flat surface 60B faces the display panel 10. The light control element 60 is fixed by the transparent resin 40 between the flat surface 60B and the second polarizer 52. The second polarizer 52 is bonded to the upper surface 12A of the second substrate 12. Details of the light control element 60 will be described later.

<<Third Configuration Example>>

Figure 6:
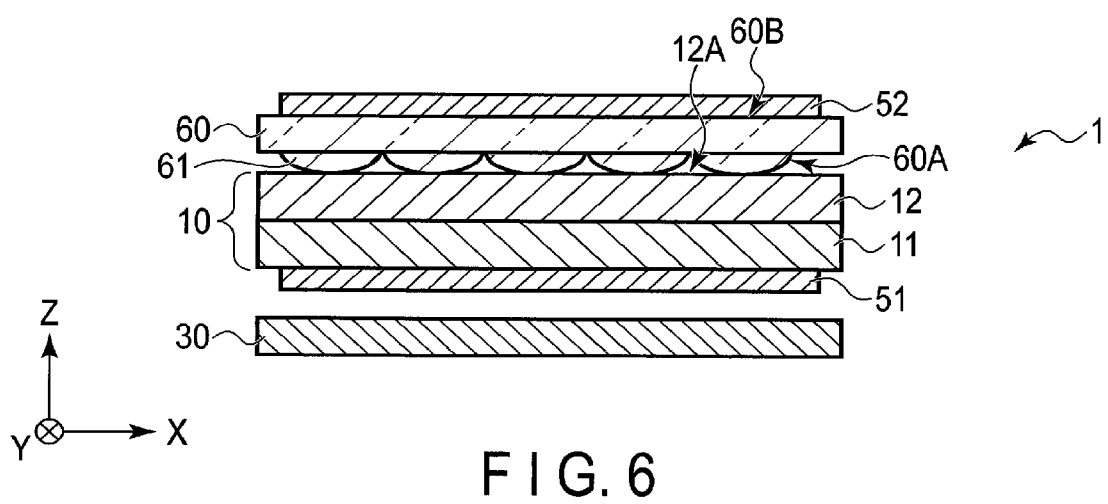
FIG. 6 is a cross-sectional view showing a third configuration example of the display device 1 of the present embodiment.

FIG. 6 is a cross-sectional view showing a third configuration example of the display device 1 of the present embodiment. The display device 1 shown in FIG. 6 is different from the display device 1 shown in FIG. 5 in that the position of the light control element 60 is different. More specifically, the lens surface 60A of the light control element 60 is in contact with the second substrate 12. Preferably, the light control element 60 should be fixed to an outer circumference of the display panel 10 though not described in detail. The second polarizer 52 is bonded to the flat surface 60B of the light control element 60. Details of the light control element 60 will be described later.

FIG. 7 is a cross-sectional view showing a configuration example of the light control element 60. Here, explanation will be given by taking the light control element 60 of the second configuration example shown in FIG. 5 as an example. The light control element 60 comprising the lenses 61 is formed of, for example, transparent glass or resin. The lenses 61 function as light controllers. The lenses 61 overlap the sub-pixels SP arranged in the first direction X. The sub-pixels SP as illustrated are provided in the display panel 10 shown in FIG. 5. The lens 61 has a width W61 along the first direction X. In one example, two lenses 61 arranged in the first direction X overlap twenty-three sub-pixels SP.

Note that in the example shown in FIG. 7, while the flat surface 60B of the light control element 60 is opposed to the sub-pixels SP, the lens surface 60A of the light control element 60 may be opposed to the sub-pixels SP as in the third configuration example shown in FIG. 6.

FIG. 8 is a plan view showing a configuration example of the light control element 60. The light control element 60 illustrated in this figure is applicable to either the second configuration example shown in FIG. 5, or the third configuration example shown in FIG. 6. In the light control element 60, the lenses 61 are arranged in the first direction X. Each of the lenses 61 extends in a direction different from the first direction X and the second direction Y. Each of the lenses 61 includes a pair of edges E61 arranged in the first direction X. The edges E61 are parallel to each other.

The lenses 61 overlap the display portion DA shown in FIG. 2, and linearly extend over the sub-pixels SP located in the odd-numbered row LA and the sub-pixels SP located in the even-numbered row LB. As in the first configuration example, the lenses 61 are inclined at the angle θ2 relative to the second direction Y. In the present embodiment, an extending direction of the lenses 61 can be defined as an extending direction of the edges E61. Each of the edges E61 is inclined at the angle θ2, which is substantially equivalent to arc tan(⅔n) relative to the second direction Y.

<<Specific Example of Light Control>>

The above-mentioned light restriction body 22 and lens 61 will be hereinafter described as a light controller 100. The light controller 100 is to control the light beams emitted from the respective sub-pixels SP.

Figure 9:
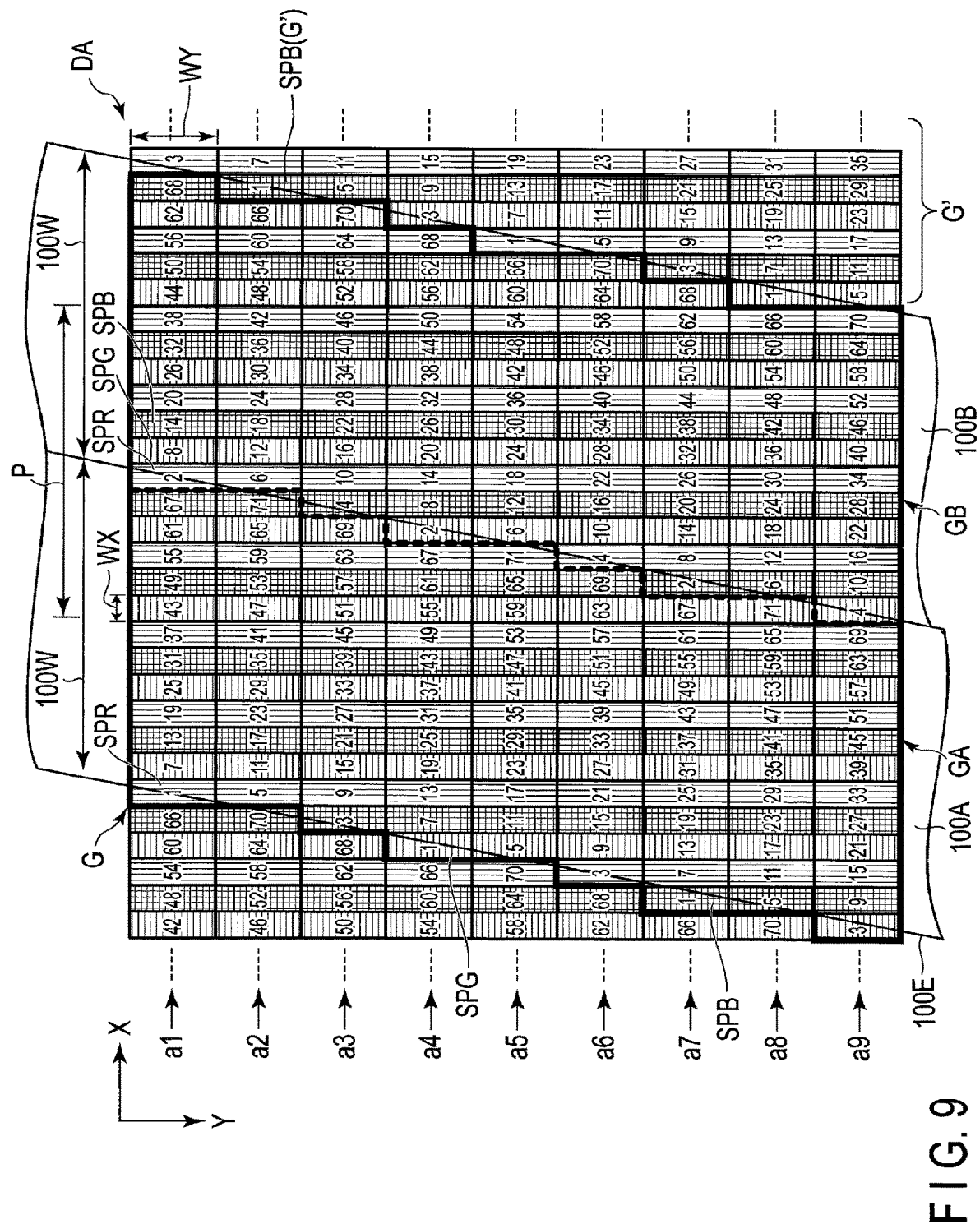
FIG. 9 is an illustration showing a first example of a layout of sub-pixels SP in a display portion DA.

FIG. 9 is an illustration showing a first example of the layout of the sub-pixels SP in the display portion DA. The display portion DA includes a pixel group G surrounded by a thick line in the drawing. The pixel group G comprises the sub-pixels SP for displaying an image of L viewpoints. Here, L represents a natural number greater than or equal to 2. In the example illustrated in FIG. 9, the sub-pixel SP is formed in a rectangular shape having the long side along the second direction Y. Alternatively, as will be described later, the sub-pixel SP may be formed in the other shapes. The viewpoints in the present specification indicate the respective observation positions arranged counterclockwise in order at an observation plane VP, although this will be described later referring to FIGS. 10A and 10B. A numeral assigned to each of the sub-pixels SP in FIG. 9 represents the number of the viewpoint.

In the pixel group G, the sub-pixels SP are arranged in a matrix in the first direction X and the second direction Y. In one example, when L is 71, and three sub-pixels SP, i.e., the red sub-pixel SPR, the green sub-pixel SPG, and the blue sub-pixel SPB, exist per viewpoint, the pixel group G comprises two hundred and thirteen (=71*3) sub-pixels SP. In the pixel group G, twenty-three or twenty-four sub-pixels SP are arranged in the first direction X, and nine sub-pixels SP are arranged in the second direction Y.

In the present embodiment, m light controllers 100 arranged in the first direction X overlap a single pixel group G. Here, m represents a natural number greater than or equal to 2. A pitch P of adjacent light controllers 100 satisfies the following equation (1):

$$P = L/3m \quad (1)$$

The pitch P is substantially equal to a width 100W along the first direction X of the light controller 100. In other words, a single light controller 100 overlaps P sub-pixels SP arranged in the first direction X. That is, the width 100W corresponds to a length that is P times as great as the first width WX of the sub-pixel SP.

For the value of P, a difference of one sub-pixel SP is permissible. In other words, the value of P can be defined by the following equation (2):

$$P = (L/3m) \pm 1 \quad (2)$$

In the example illustrated in FIG. 9, the red sub-pixel SPR, the green sub-pixel SPG, and the blue sub-pixel SPB have substantially the same first width WX. However, the red sub-pixel SPR, the green sub-pixel SPG, and the blue sub-pixel SPB may not all have the same width along the first direction X. In such a case, the first width WX is defined as the average value of the respective widths of the red sub-pixel SPR, the green sub-pixel SPG, and the blue sub-pixel SPB along the first direction X (or the average value of the widths along the first direction X of all of the sub-pixels SP that are arranged in the first direction X in the display portion DA).

The example illustrated in FIG. 9 corresponds to a case where L is 71, and m is 2. Accordingly, based on the above equation (1), P is approximately 11.8 (since P=71/6). In other words, a first light controller 100A and a second light controller 100B are arranged in the first direction X, and these two light controllers 100A and 100B overlap one pixel group G. Each of the first light controller 100A and the second light controller 100B overlaps approximately eleven point one (11.8) sub-pixels SP arranged in the first direction X. The first light controller 100A and the second light controller 100B both have the same width 100W along the first direction X. The pitch P or the width 100W corresponds to a size of approximately 11.8 times the first width WX of the sub-pixel SP. Also, based on the above equation (2), the pitch P or the width 100W corresponds to a size of approximately (11.8±1) times the first width WX of the sub-pixel SP. For example, when the first width WX is 100 μm, the pitch P or the width 100W is 1080 μm to 1280 μm.

In the example illustrated in FIG. 9, the pixel group G comprises a first block GA including the sub-pixels SP corresponding to the odd-numbered viewpoints, and a second block GB including the sub-pixels SP corresponding to the even-numbered viewpoints, of a plurality of viewpoints. The first block GA and the second block GB are arranged in the first direction X. In other words, the first block GA comprises one hundred and eight (=36*3) sub-pixels corresponding to the odd-numbered viewpoints of one to seventy-one viewpoints. Further, the second block GB comprises one hundred and five (=35*3) sub-pixels corresponding to the even-numbered viewpoints of one to sixty-nine viewpoints.

The first light controller 100A overlaps the first block GA as seen in plan view. The second light controller 100B overlaps the second block GB as seen in plan view.

FIG. 10A is an illustration showing the relationship between a viewpoint in a virtual observation plane VP and the sub-pixel SP to be observed. FIG. 10A corresponds to an illustration showing the relationship between the first light controller 100A and the respective sub-pixels SP of the first block GA. In one example, L is 71 as stated above, and seventy-one viewpoints, i.e., viewpoints "1" to "71", exist in the observation plane VP.

In FIG. 10A, while the odd-numbered viewpoints exist in the observation plane VP, representative viewpoints "1" to "67" are denoted, and visual lines V1 to V67 corresponding to the viewpoints "1" to "67", respectively, are illustrated. The visual lines V1 to V67 may be assumed as light beams restricted by the first light controller 100A. The visual lines V1 to V67 are line segments connecting between the viewpoints "1" to "67" and the sub-pixels SP of a first row a1, respectively, when the viewer's eye is assumed to be at the corresponding viewpoint in the observation plane VP.

Note that the viewpoints "3" and "5" that are not illustrated exist between the viewpoints "1" and "7" in the observation plane VP. Also, visual lines V3 and V5 that are not illustrated exist between the visual lines V1 and V7. The visual line V3 is a line segment connecting between the viewpoint "3" and the sub-pixel SP indicated as "3" in a third row a3. The visual line V5 is a line segment connecting between the viewpoint "5" and the sub-pixel SP indicated as "5" in a second row a2.

In the first block GA, at the first row a1, the sub-pixels SP observed from the viewpoints represented as (6c−5) are arranged. Note that c is an integer greater than or equal to 1. In the second row a2, the sub-pixels SP observed from the viewpoints represented as (6c−1) are arranged. In the third row a3, the sub-pixels SP observed from the viewpoints represented as (6c−3) are arranged.

Figure 10B:
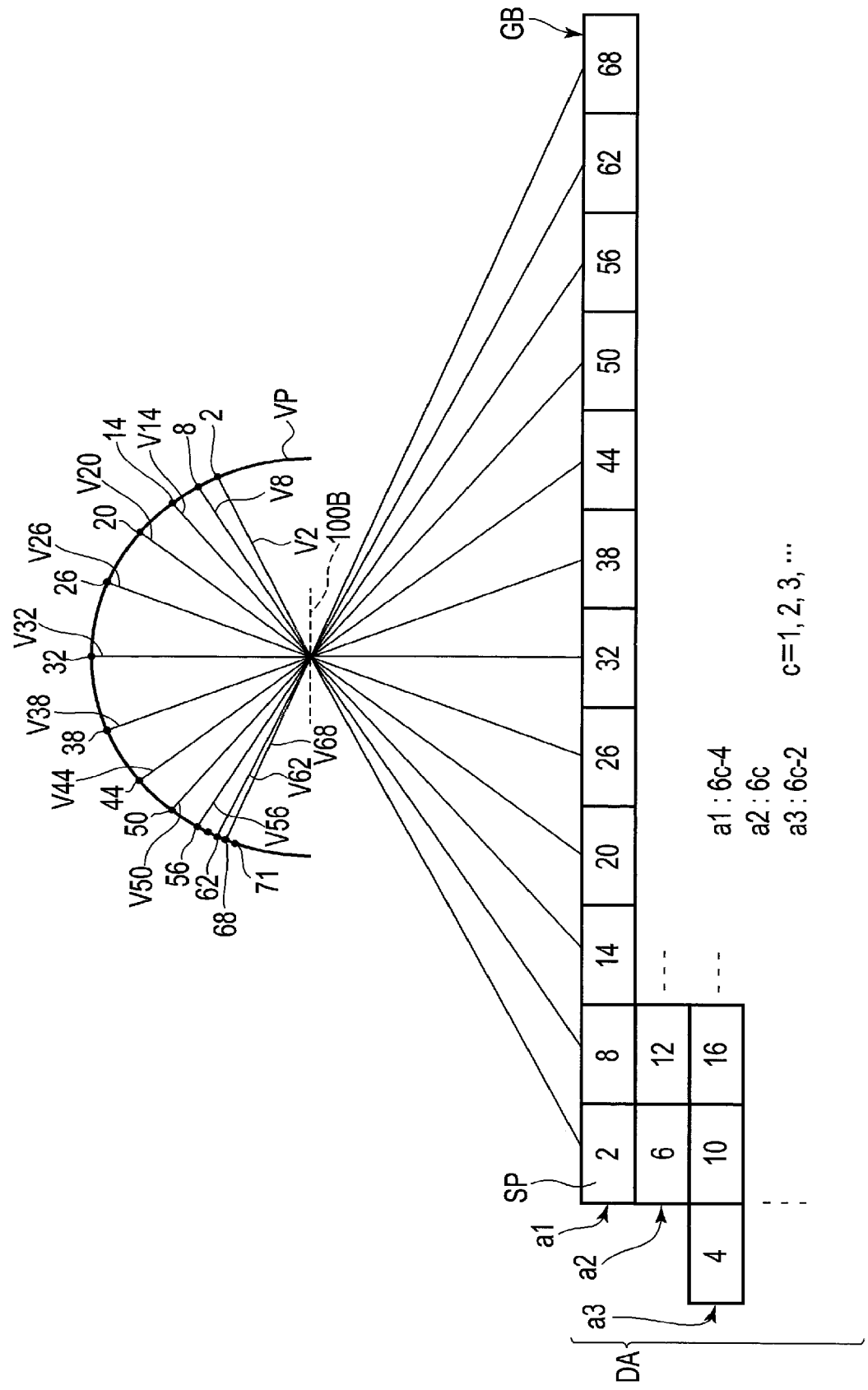
FIG. 10B is an illustration showing the relationship between a viewpoint in the virtual observation plane VP and the sub-pixel SP to be observed.

FIG. 10B is an illustration showing the relationship between a viewpoint in the virtual observation plane VP and the sub-pixel SP to be observed. FIG. 10B corresponds to an illustration showing the relationship between the second light controller 100B and the respective sub-pixels SP of the second block GB. In FIG. 10B, while the even-numbered viewpoints exist in the observation plane VP, representative viewpoints "2" to "68" are denoted, and visual lines V2 to V68 corresponding to the viewpoints "2" to "68", respectively, are illustrated. The visual lines V2 to V68 may be assumed as light beams restricted by the second light controller 100B. The visual lines V2 to V68 are line segments connecting between the viewpoints "2" to "68" and the sub-pixels SP of the first row a1, respectively, when the viewer's eye is assumed to be at the corresponding viewpoint in the observation plane VP.

Note that the viewpoints "4" and "6" that are not illustrated exist between the viewpoints "2" and "8" in the observation plane VP. Also, visual lines V4 and V6 that are not illustrated exist between the visual lines V2 and V8. The visual line V4 is a line segment connecting between the viewpoint "4" and the sub-pixel SP indicated as "4" in the third row a3. The visual line V6 is a line segment connecting between the viewpoint "6" and the sub-pixel SP indicated as "6" in the second row a2.

In the second block GB, at the first row a1, the sub-pixels SP observed from the viewpoints represented as (6c−4) are arranged. In the second row a2, the sub-pixels SP observed from the viewpoints represented as (6c) are arranged. In the third row a3, the sub-pixels SP observed from the viewpoints represented as (6c−2) are arranged.

As described above referring to FIGS. 10A and 10B, seventy-one viewpoints, i.e., viewpoints "1" to "71", exist in the observation plane VP, seventy-one sub-pixels SP indicated as "1" to "71" exist in the display portion DA, and seventy-one corresponding visual lines, i.e., visual lines V1 to V71, exist between the observation plane VP and the display portion DA.

The sub-pixels SP arranged in the first direction X display images to be observed from the corresponding viewpoints. The viewer who is at the observation plane VP can see the sub-pixel SP through one of the visual lines V1 to V71 when the display portion DA is observed via the first light controller 100A and the second light controller 100B. The viewpoint in the observation plane VP is different in the right eye and the left eye of the viewer. Accordingly, the viewer can recognize a parallax by images observed differently from different viewpoints, and thus three-dimensionality of the image can be obtained. Further, when the viewer changes the viewpoint along the observation plane VP, images according to the respective seventy-one viewpoints can be observed, and more natural stereoscopic effect can be obtained.

Returning to FIG. 9, the layout of the sub-pixels SP will be described again.

The sub-pixels SP indicated by the same numeral in FIG. 9 correspond to the sub-pixels that are observed from the same viewpoint. In three rows that are arranged consecutively in the second direction Y, the pixel group G comprises seventy-one sub-pixels SP in total. These seventy-one sub-pixels SP are observed from seventy-one different viewpoints, respectively.

The first row a1, the fourth row a4, and the seventh row a7 include the sub-pixels SP that are similarly arranged. Each of the sub-pixels SP in the first row a1, the fourth row a4, and the seventh row a7 displays an image corresponding to a viewpoint represented as (6c−5) in the first block GA, and an image corresponding to a viewpoint represented as (6c−4) in the second block GB.

The second row a2, a fifth row a5, and an eighth row a8 include the sub-pixels SP that are similarly arranged. Each of the sub-pixels SP in the second row a2, the fifth row a5, and the eighth row a8 displays an image corresponding to a viewpoint represented as (6c−1) in the first block GA, and an image corresponding to a viewpoint represented as (6c) in the second block GB.

The third row a3, the sixth row a6, and the ninth row a9 include the sub-pixels SP that are similarly arranged. Each of the sub-pixels SP in the third row a3, the sixth row a6, and the ninth row a9 displays an image corresponding to a viewpoint represented as (6c−3) in the first block GA, and an image corresponding to a viewpoint represented as (6c−2) in the second block GB.

In the sub-pixels SP of the three consecutive rows, one of the red sub-pixel SPR, the green sub-pixel SPG, and the blue sub-pixel SPB to be observed from the same viewpoint is included. Further, in order to realize color display at the same viewpoint, all of the red sub-pixel SPR, the green sub-pixel SPG, and the blue sub-pixel SPB corresponding to the same viewpoint are included in a set of sub-pixels SP of nine consecutive rows.

More specifically, as regards the sub-pixels to be observed from the same viewpoint, the sub-pixel of a first color is included in one of the first row a1 to the third row a3, the sub-pixel of a second color different from the first color is included in one of the fourth row a4 to the sixth row a6, and the sub-pixel of a third color different from the first color and the second color is included in one of the seventh row a7 to the ninth row a9. In one example, when the display portion DA is observed from the viewpoint "1", the red sub-pixel SPR is included in the first row a1, the green sub-pixel SPG is included in the fourth row a4, and the blue sub-pixel SPB is included in the seventh row a7. The red sub-pixel SPR, the green sub-pixel SPG, and the blue sub-pixel SPB which display images of the same viewpoint are arranged in a direction in which an edge 100E of the first light controller 100A extends.

Figure 11:
FIG. 11 is an illustration for explaining the layout of pixel groups G shown in FIG. 9.

FIG. 11 is an illustration for explaining the layout of the pixel groups G shown in FIG. 9. The pixel groups G arranged in the first direction X are disposed with an inclination of angle θ3 greater than 0°. In other words, the pixel groups G adjacent to each other in the first direction X are shifted in the second direction Y. The angle θ3 may be an angle formed clockwise relative to the first direction X, or may be one formed counterclockwise relative to the first direction X. The extending direction of the edge E23 shown in FIG. 4, or the extending direction of the lens 61 shown in FIG. 8 is a direction inclined clockwise relative to the second direction Y at an acute angle of angle θ2, for example. In the above, the adjacently arranged pixel groups G are also disposed at an acute angle of angle θ3, which is formed clockwise relative to the first direction X. Note that when the extending direction of the edge E23 or the lens 61 is a direction inclined counterclockwise relative to the second direction Y at the angle θ2, the adjacently arranged pixel groups G are also disposed at the angle θ3, which is formed counterclockwise relative to the first direction X. In other words, the angles θ2 and θ3 are angles of the same rotational direction with respect to a reference direction in the X-Y plane.

In one example, the pixel group G shown in FIG. 9 includes the red sub-pixel SPR of the viewpoint "1" in the first row a1. A pixel group G' adjacent to the pixel group G includes the blue sub-pixel SPB of the viewpoint "1" in the second row a2. When twenty-four sub-pixels are arranged in the first row a1 of the pixel group G, and the second width WY of a single sub-pixel is approximately three times as great as the first width WX, the angle θ3 is substantially equivalent to arc tan(⅛), which is approximately 7°. Note that the optimal value for the angle θ3 is varied according to the number of sub-pixels SP provided in the pixel group G, the layout of the sub-pixels SP, the values of L, m, and n, and the like.

Figure 12:
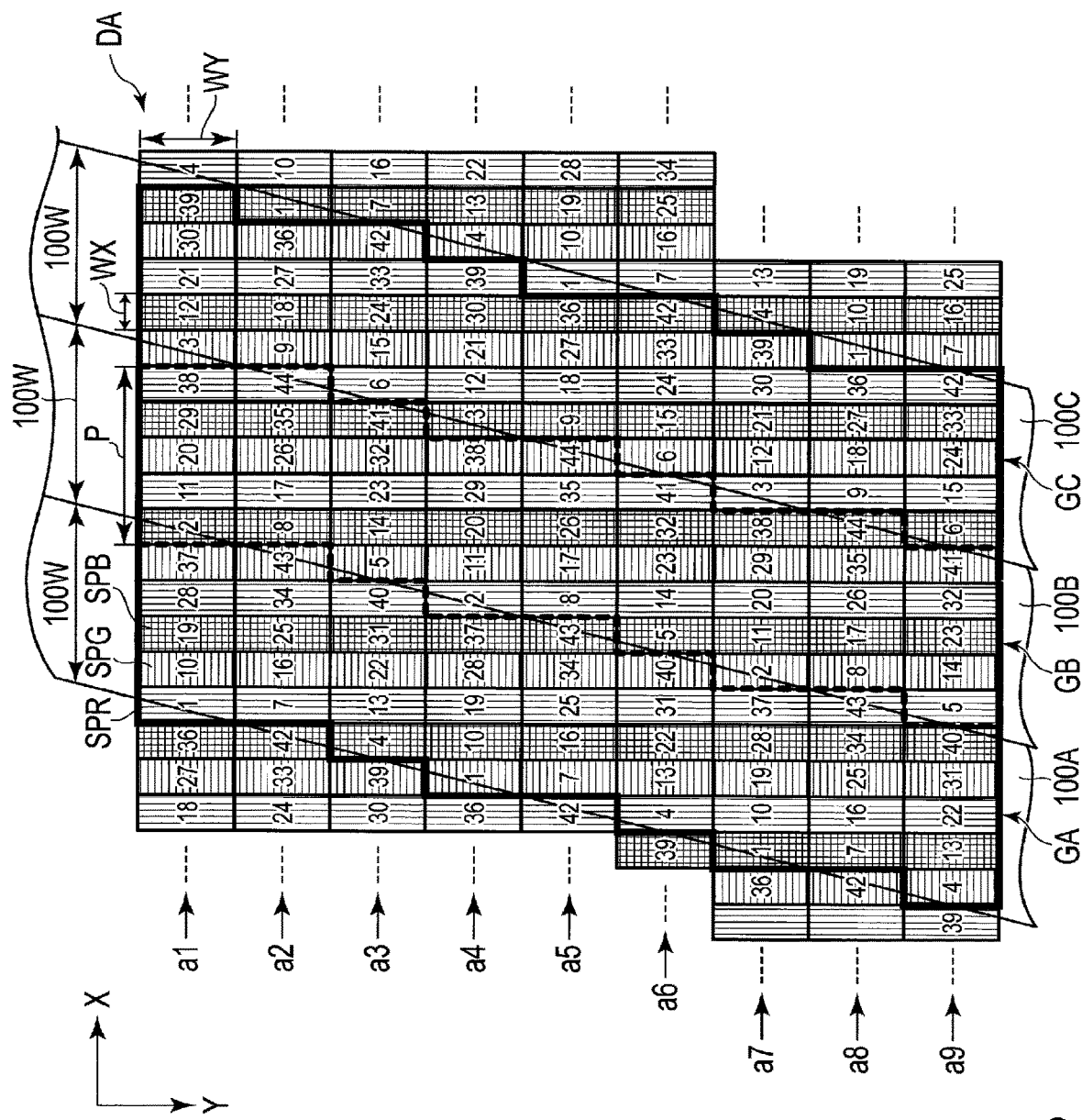
FIG. 12 is an illustration showing a second example of a layout of the sub-pixels SP in the display portion DA.

FIG. 12 is an illustration showing a second example of the layout of the sub-pixels SP in the display portion DA. The second example shown in FIG. 12 is different from the first example shown in FIG. 9 in that the number L of the viewpoints is 44, and the number m of the light controllers 100 overlapping the pixel group G is 3.

The display portion DA includes the pixel group G surrounded by a thick line in the drawing. Since three sub-pixels SP, i.e., the red sub-pixel SPR, the green sub-pixel SPG, and the blue sub-pixel SPB, exist per viewpoint, the pixel group G comprises one hundred and thirty-two (=44*3) sub-pixels SP. In the pixel group G, fourteen or fifteen sub-pixels SP are arranged in the first direction X, and nine sub-pixels SP are arranged in the second direction Y.

When L is 44, and m is 3, based on the above equation (1), P is approximately 4.9 (since P=44/9). The first light controller 100A, the second light controller 100B, and a third light controller 100C are arranged in the first direction X, and overlap one pixel group G. Each of the first light controller 100A, the second light controller 100B, and the third light controller 100C overlaps approximately four point nine (4.9) sub-pixels SP arranged in the first direction X. The first light controller 100A, the second light controller 100B, and the third light controller 100C all have the same width 100W along the first direction X. The pitch P is substantially the same as the width 100W. The pitch P or the width 100W corresponds to a size of approximately 4.9 times the first width WX of the sub-pixel SP.

Also, based on the above equation (2), the pitch P or the width 100W corresponds to a size of approximately (4.9±1) times the first width WX of the sub-pixel SP.

The pixel group G comprises the first block GA, the second block GB, and a third block GC. The first block GA, the second block GB, and the third block GC are arranged in the first direction X. The first block GA includes the sub-pixels SP to be observed from the viewpoints represented as (3c−2) of the viewpoints. The second block GB includes the sub-pixels SP to be observed from the viewpoints represented as (3c−1) of the viewpoints. The third block GC includes the sub-pixels SP to be observed from the viewpoints represented as (3c) of the viewpoints. Note that c is an integer greater than or equal to 1.

In planar view, the first light controller 100A overlaps the first block GA, the second light controller 100B overlaps the second block GB, and the third light controller 100C overlaps the third block GC.

In three rows that are arranged consecutively in the second direction Y, the pixel group G comprises forty-four sub-pixels SP in total. These forty-four sub-pixels SP are observed from forty-four different viewpoints, respectively. The first row a1, the fourth row a4, and the seventh row a7 include the sub-pixels SP that are similarly arranged. The second row a2, the fifth row a5, and the eighth row a8 include the sub-pixels SP that are similarly arranged. The third row a3, the sixth row a6, and the ninth row a9 include the sub-pixels SP that are similarly arranged. In the sub-pixels SP of the three consecutive rows, one of the red sub-pixel SPR, the green sub-pixel SPG, and the blue sub-pixel SPB to be observed from the same viewpoint is included. Further, in order to realize color display at the same viewpoint, all of the red sub-pixel SPR, the green sub-pixel SPG, and the blue sub-pixel SPB corresponding to the same viewpoint are included in a set of sub-pixels SP of nine consecutive rows.

Also in the second example as described above, the pixel groups G arranged in the first direction X are shifted in the second direction Y. With respect to the pixel group G shown in FIG. 12, when fifteen sub-pixels are arranged in the first row a1, and the second width WY of a single sub-pixel is approximately three times as great as the first width WX, the angle θ3 is substantially equivalent to arc tan(⅕), which is approximately 11°.

Figure 13:
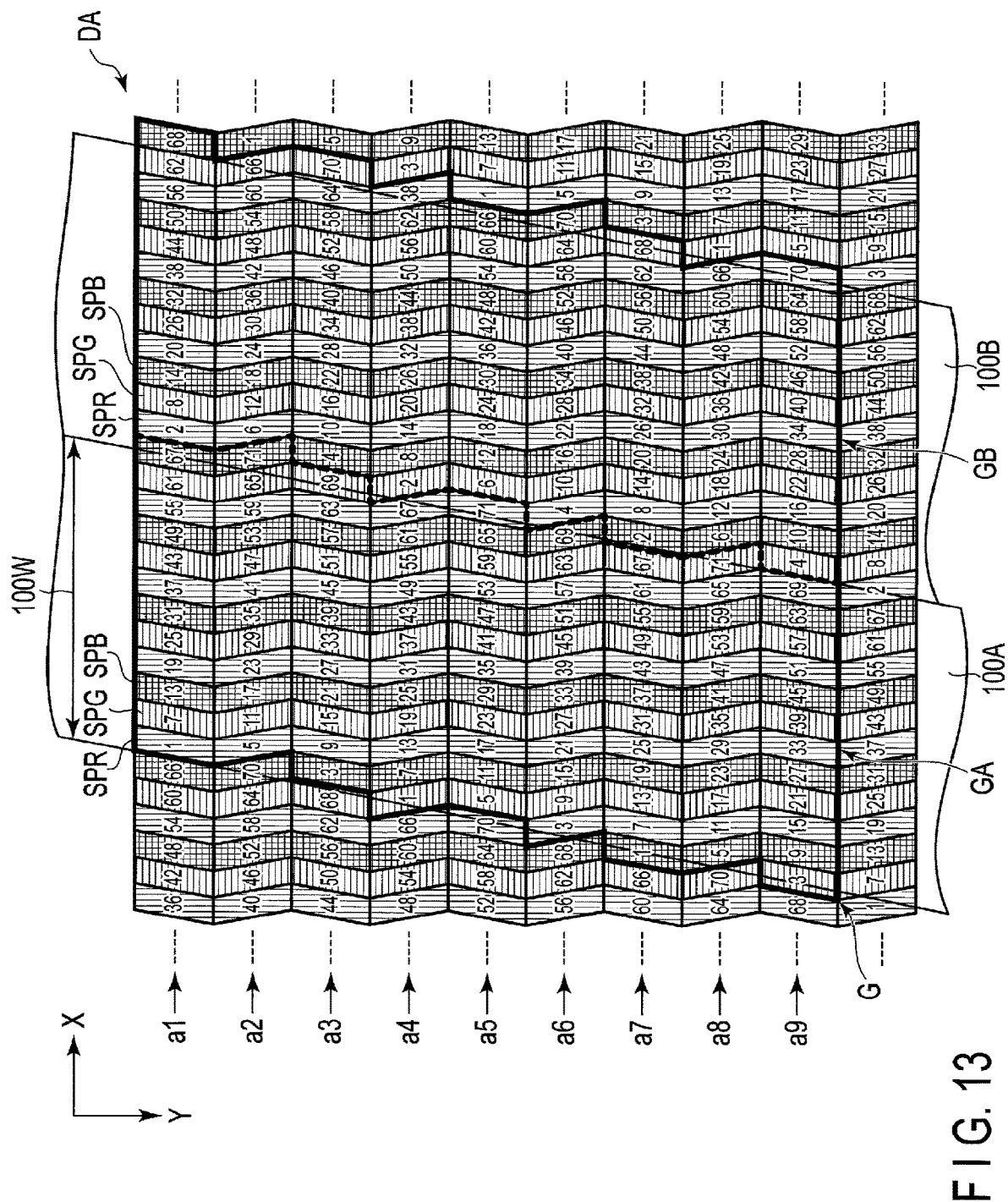
FIG. 13 is an illustration showing a third example of a layout of the sub-pixels SP in the display portion DA.

FIG. 13 is an illustration showing a third example of the layout of the sub-pixels SP in the display portion DA. The third example shown in FIG. 13 is different from the first example shown in FIG. 9 in that two hundred and thirteen sub-pixels SP are formed in a parallelogram shape. Note that the numerals assigned to the respective sub-pixels SP are the same as those of the first example shown in FIG. 9, and represent the numbers of the viewpoints, respectively. Also in the third example shown in FIG. 13, the number L of the viewpoints is 71, the pixel group G comprises two hundred and thirteen (=71*3) sub-pixels SP, and the number m of the light controllers 100 overlapping the pixel group G is 2. The first light controller 100A overlaps the first block GA, and the second light controller 100B overlaps the second block GB.

FIG. 14 is an illustration showing a fourth example of the layout of the sub-pixels SP in the display portion DA. The fourth example shown in FIG. 14 is different from the second example shown in FIG. 12 in that one hundred and thirty-two sub-pixels SP are formed in a parallelogram shape. Note that the numerals assigned to the respective sub-pixels SP are the same as those of the second example shown in FIG. 12, and represent the numbers of the viewpoints, respectively. Also in the fourth example shown in FIG. 14, the number L of the viewpoints is 44, the pixel group G comprises one hundred and thirty-two (=44*3) sub-pixels SP, and the number m of the light controllers 100 overlapping the pixel group G is 3. The first light controller 100A, the second light controller 100B, and the third light controller 100C overlap the pixel group G.

FIG. 15 is a plan view showing the sub-pixels SP to be observed when the light restriction body 22 is applied as the light controller 100. As in the third example shown in FIG. 13, and the fourth example shown in FIG. 14, the pixel group G comprises the sub-pixel SP formed in a parallelogram shape. The light control element 20 overlaps the pixel group G. The opening 24 in the light restriction body 22 extends linearly over the sub-pixels SP from the first row a1 to the ninth row a9.

In the example illustrated in FIG. 15, in the sub-pixel SP, when the width WX is assumed as 1, the width WY is 3. The angle θ1 is 15°, and the angle θ2 is 12.5°. In a state in which the light control element 20 overlaps the pixel group G, the opening 24 overlaps each of the green sub-pixel SPG indicated as "1", the blue sub-pixel SPB indicated as "1", and the red sub-pixel SPR indicated as "1". Accordingly, when the display portion DA is observed from the viewpoint "1" shown in FIG. 10A, the green sub-pixel SPG, the blue sub-pixel SPB, and the red sub-pixel SPR corresponding to this viewpoint can be observed.

FIG. 16 is a plan view showing the sub-pixels SP to be observed when the lens 61 is applied as the light controller 100. The lens 61 extends linearly over the sub-pixels SP from the first row a1 to the ninth row a9.

In the example illustrated in FIG. 16, in the sub-pixel SP, when the width WY is assumed as 1, the width WY is 3. The angle θ1 is 15°, and the angle θ2 is 12.5°. In a state in which the light control element 20 overlaps the pixel group G, the green sub-pixel SPG, the blue sub-pixel SPB, and the red sub-pixel SPR, which are all indicated as "1", are located on the same straight line parallel to the extending direction of the lens 61. Accordingly, when the display portion DA is observed from the viewpoint "1" shown in FIG. 10A, the green sub-pixel SPG, the blue sub-pixel SPB, and the red sub-pixel SPR corresponding to this viewpoint can be observed.

<<Comparison of Three-Dimensionality of Display Image>>

Figure 17:
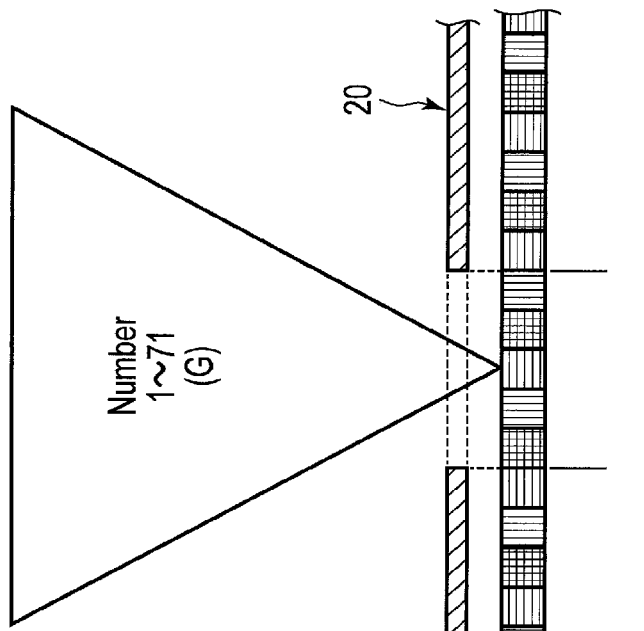
FIG. 17 is an illustration showing the state in which the sub-pixel SP is observed via the light restriction body 22 of a comparative example.

FIG. 17 is an illustration showing the state in which the sub-pixel SP is observed via the light restriction body 22 of a comparative example. A single light restriction body 22 overlaps one pixel group G, and the opening 24 has a width equal to a width of five sub-pixels SP, for example. In such a comparative example, the sub-pixels SP corresponding to seventy-one viewpoints in the pixel group G are observed through one opening 24.

FIG. 18 is an illustration showing the state in which the sub-pixel SP is observed via the light restriction body 22 of the first configuration example. The example illustrated in FIG. 18 corresponds to a case where m is 2. Two light restriction bodies, i.e., the light restriction bodies 22A and 22B, overlap one pixel group G. The light restriction body 22A includes a light-shielding body 23A and an opening 24A, and the light restriction body 22B includes a light-shielding body 23B and an opening 24B.

Each of the openings 24A and 24B has a width equal to a width of two point five (2.5) sub-pixels SP. In other words, a total area of the openings 24A and 24B overlapping one pixel group G is equal to the area of the opening 24 shown in FIG. 17. In the first configuration example as described above, not only is the first block GA (the sub-pixels SP corresponding to the odd-numbered viewpoints) in the pixel group G observed through a single opening 24A, but also the second block GB (the sub-pixels SP corresponding to the even-numbered viewpoints) is observed through a single opening 24B.

According to the first configuration example as described above, the number of sub-pixels SP observed through one of the openings 24A and 24B is less than the number of sub-pixels SP observed through the opening 24. In other words, the number of light beams which reach the viewer's eye is restricted as compared to the comparative example, and the number of viewpoints from which observation is performed is also restricted. Meanwhile, the sub-pixels SP corresponding to different viewpoints are observed through the openings 24A and 24B, which are greater in number than the opening of the comparative example. Accordingly, as compared to a case where the sub-pixels SP corresponding to many viewpoints as in the comparative example are simultaneously observed through a single opening 24, a clearer stereoscopic view can be obtained.

Also, since the total area of the openings 24A and 24B is equal to the area of the opening 24, the luminance of the display image to be observed can be made substantially the same as the luminance of the comparative example.

While explanation has been given for a case in which the light restriction body 22 of the first configuration example is applied as an example of the light controller 100, the same advantage can be obtained also in cases in which the lenses 61 of the second configuration example and the third configuration example are applied as the other light controllers 100.

Also, according to the present embodiment, the light control element 20 or 60 overlaps the display panel 10 comprising the display portion DA shown in FIG. 2, and moreover, comprises the light controller which is inclined at the angle θ2 substantially equivalent to arc tan(⅔n), with respect to the sub-pixels SP inclined at the angle θ1 greater than or equal to 4° and less than or equal to 16°. By defining the above angles θ1 and θ2, occurrence of a moiré between regularly arranged sub-pixels SP and regularly arranged light controllers can be suppressed, and the resolution can be improved.

<<Variations of Shapes of Sub-Pixels SP>>

Figure 19:
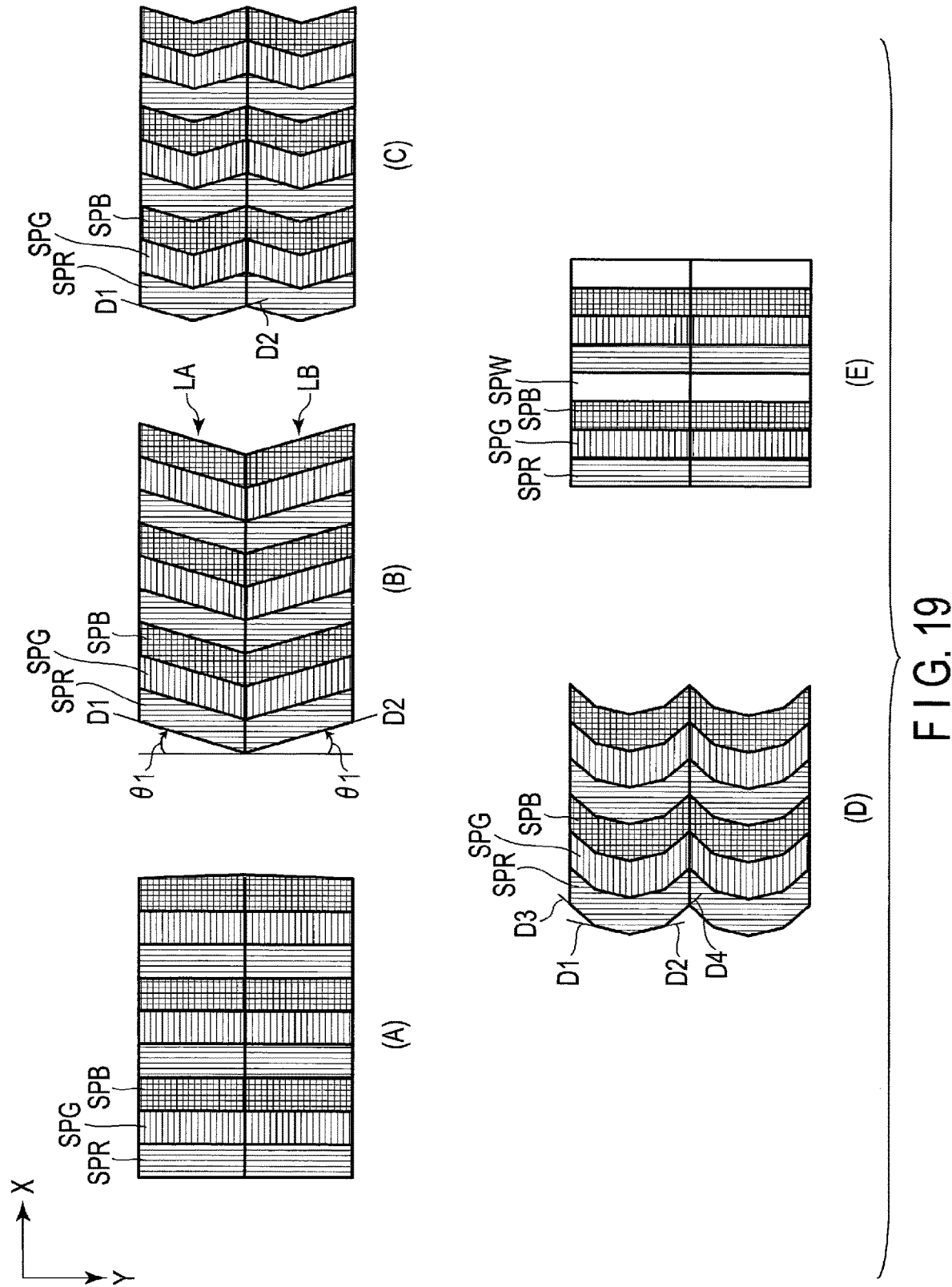
FIG. 19 is an illustration showing variations of the shapes of the sub-pixels SP.

FIG. 19 is an illustration showing variations of the shapes of the sub-pixels SP. FIGS. 19(A) to (D) respectively show the red sub-pixel SPR, the green sub-pixel SPG, and the blue sub-pixel SPB that are arranged in the first direction X. FIG. 19(E) illustrates the red sub-pixel SPR, the green sub-pixel SPG, the blue sub-pixel SPB, and a white sub-pixel SPW that are arranged in the first direction X. In the following, each of their shapes will be explained by referring to the sub-pixels as the sub-pixels SP in disregard of the colors.

In FIGS. 19(A) and (E), the shape of the sub-pixel SP is a rectangle elongated in the second direction Y.

In FIG. 19(B), the shape of the sub-pixel SP in the odd-numbered row LA is a parallelogram elongated in direction D1 intersecting the second direction Y clockwise at the angle θ1. The shape of the sub-pixel SP in the even-numbered row LB is a parallelogram elongated in direction D2 intersecting the second direction Y counterclockwise at the angle θ1.

In FIG. 19(C), the sub-pixel SP is formed in the shape of letter V with the sides extending in directions D1 and D2.

In FIG. 19(D), the sub-pixel SP is formed in an arcuate shape with the sides extending in directions D3 and D4, in addition to directions D1 and D2.

Note that in each of the examples shown in FIGS. 19(B) to (D), the white sub-pixel SPW may be added.

In the present embodiment, L is not limited to 71 or 44, n is not limited to 3, and m is not limited to 2 or 3. For example, m may be greater than 3. Also, when the red sub-pixel SPR, the green sub-pixel SPG, the blue sub-pixel SPB, and the white sub-pixel SPW are arranged in the first direction X, n is equal to 4. However, even in a case where n is 4, combination of the colors of the sub-pixel can be changed variously.

As has been explained above, according to the present embodiment, it is possible to provide a display device whose display quality can be improved.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. For example, some structural elements may be deleted from the entire structural elements in the embodiments. Furthermore, structural elements described in different embodiments may be combined suitably.

An example of the display device which can be obtained from the structures disclosed in the present specification is noted as follows:

(1) A display device comprising:

a display portion comprising sub-pixels arranged in a first direction, and a second direction orthogonal to the first direction; and a light control element overlapping the display portion, in which the display portion comprises a pixel group comprising the sub-pixels for displaying an image of L viewpoints, the light control element comprises light controllers arranged in the first direction, each of the light controllers extends in an oblique direction different from the first direction and the second direction, the light controllers, the number of which is equal to m, overlap the pixel group, L and m each represent a natural number greater than or equal to 2, the light controller overlaps the sub-pixels, the number of which is equal to P, arranged in the first direction, and P, L, m satisfy the relationship of P=L/3m.

(2) The display device according to (1) in which:

the sub-pixel has a first width along the first direction, and a second width along the second direction;

the second width is n times as great as the first width;

n represents a natural number greater than or equal to 2; and the light controller is inclined at an angle substantially equivalent to arc tan (⅔n) relative to the second direction.

(3) The display device according to (1) in which:

the sub-pixels adjacent to each other in the first direction display colors different from each other; and the sub-pixels adjacent to each other in the second direction display a same color.

(4) The display device according to (1) in which each of the sub-pixels is formed in a parallelogram shape, and is inclined at an angle greater than or equal to 4° and less than or equal to 16° relative to the second direction.

(5) The display device according to (4) in which one of the sub-pixel in an odd-numbered row and the sub-pixel in an even-numbered row is inclined clockwise relative to the second direction, and the other sub-pixel is inclined counterclockwise relative to the second direction.

(6) The display device according to (1) in which:

the light controller is a light restriction body or a lens;

the light restriction body comprises a light-shielding body overlapping the sub-pixels arranged in the first direction, and an opening overlapping at least one of the sub-pixels; and the lens overlaps the sub-pixels arranged in the first direction.

(7) The display device according to (1) in which:

the pixel group comprises a first block including the sub-pixel corresponding to an odd-numbered viewpoint, and a second block including the sub-pixel corresponding to an even-numbered viewpoint, of the viewpoints that are positioned in order in an observation plane; and the first block and the second block are arranged in the first direction.

(8) The display device according to (7) in which the light control element comprises a first light controller overlapping the first block, and a second light controller overlapping the second block.

(9) The display device according to (1) in which:

the pixel group comprises a first block comprising the sub-pixel corresponding to a viewpoint represented as (3c−2), a second block comprising the sub-pixel corresponding to a viewpoint represented as (3c−1), and a third block comprising the sub-pixel corresponding to a viewpoint represented as (3c), where c is an integer greater than or equal to 1, of the viewpoints that are positioned in order in an observation plane; and the first block, the second block, and the third block are arranged in the first direction.

(10) The display device according to (9) in which the light control element comprises a first light controller overlapping the first block, a second light controller overlapping the second block, and a third light controller overlapping the third block.

(11) The display device according to (1) in which:

the display portion comprises a red sub-pixel, a green sub-pixel, and a blue sub-pixel, as the sub-pixels which display images of a same viewpoint; and the red sub-pixel, the green sub-pixel, and the blue sub-pixel are arranged in a direction in which the light controller extends.

(12) The display device according to (11) in which the red sub-pixel, the green sub-pixel, and the blue sub-pixel are located in a first row, a fourth row, and a seventh row of the pixel group, respectively.

(13) The display device according to (1) in which:

the display portion comprises a plurality of pixel groups, each of which is identical to the pixel group; and the pixel groups adjacent to each other in the first direction are shifted in the second direction.

What is claimed is:

1. A display device comprising:
   a display portion comprising sub-pixels arranged in a first direction, and a second direction orthogonal to the first direction; and
   a light control element overlapping the display portion, wherein
   the display portion comprises a pixel group comprising the sub-pixels for displaying an image of L viewpoints,
   the light control element comprises light controllers arranged in the first direction,
   each of the light controllers extends in an oblique direction different from the first direction and the second direction,
   the light controllers, the number of which is equal to m, overlap the pixel group,
   L and m each represent a natural number greater than or equal to 2,
   a pitch P of adjacent light controllers satisfies the relationship of P=L/3 m,
   the sub-pixel has a first width along the first direction, and a second width along the second direction,
   the second width is n times as great as the first width,
   n represents a natural number greater than or equal to 2, and
   the light controller is inclined at an angle substantially equivalent to arctan (⅔n) relative to the second direction.

2. The display device according to claim 1, wherein:
   the sub-pixels adjacent to each other in the first direction display colors different from each other; and
   the sub-pixels adjacent to each other in the second direction display a same color.

3. The display device according to claim 1, wherein:
   the light controller is a light restriction body or a lens;
   the light restriction body comprises a light-shielding body overlapping the sub-pixels arranged in the first direction, and an opening overlapping at least one of the sub-pixels; and
   the lens overlaps the sub-pixels arranged in the first direction.

4. The display device according to claim 1, wherein:
   the display portion comprises a plurality of pixel groups, each of which is identical to the pixel group; and the pixel groups adjacent to each other in the first direction are shifted in the second direction.

5. The display device according to claim 1, wherein each of the sub-pixels is formed in a parallelogram shape, and is inclined at an angle greater than or equal to 4° and less than or equal to 16° relative to the second direction.

6. The display device according to claim 5, wherein one of the sub-pixel in an odd-numbered row and the sub-pixel in an even-numbered row is inclined clockwise relative to the second direction, and the other sub-pixel is inclined counterclockwise relative to the second direction.

7. The display device according to claim 1, wherein:
the pixel group comprises a first block including the sub-pixel corresponding to an odd-numbered viewpoint, and a second block including the sub-pixel corresponding to an even-numbered viewpoint, of the viewpoints that are positioned in order in an observation plane; and
the first block and the second block are arranged in the first direction.

8. The display device according to claim 7, wherein the light control element comprises a first light controller overlapping the first block, and a second light controller overlapping the second block.

9. The display device according to claim 1, wherein:
the pixel group comprises a first block comprising the sub-pixel corresponding to a viewpoint represented as (3c-2), a second block comprising the sub-pixel corresponding to a viewpoint represented as (3c-1), and a third block comprising the sub-pixel corresponding to a viewpoint represented as (3c), where c is an integer greater than or equal to 1, of the viewpoints that are positioned in order in an observation plane; and
the first block, the second block, and the third block are arranged in the first direction.

10. The display device according to claim 9, wherein the light control element comprises a first light controller overlapping the first block, a second light controller overlapping the second block, and a third light controller overlapping the third block.

11. The display device according to claim 1, wherein:
the display portion comprises a red sub-pixel, a green sub-pixel, and a blue sub-pixel, as the sub-pixels which display images of a same viewpoint; and
the red sub-pixel, the green sub-pixel, and the blue sub-pixel are arranged in a direction in which the light controller extends.

12. The display device according to claim 11, wherein the red sub-pixel, the green sub-pixel, and the blue sub-pixel are located in a first row, a fourth row, and a seventh row of the pixel group, respectively.

13. A display device comprising:
a display portion comprising sub-pixels arranged in a first direction, and a second direction orthogonal to the first direction; and
a light control element overlapping the display portion, wherein
the display portion comprises a pixel group comprising the sub-pixels for displaying an image of L viewpoints,
the light control element comprises light controllers arranged in the first direction,
each of the light controllers extends in an oblique direction different from the first direction and the second direction,
the light controllers, the number of which is equal to m, overlap the pixel group,
L and m each represent a natural number greater than or equal to 2,
a pitch P of adjacent light controllers satisfies the relationship of P=L/3m,
the pixel group comprises a first block comprising the sub-pixel corresponding to a viewpoint represented as (3c-2), a second block comprising the sub-pixel corresponding to a viewpoint represented as (3c-1), and a third block comprising the sub-pixel corresponding to a viewpoint represented as (3c), where c is an integer greater than or equal to 1, of the viewpoints that are positioned in order in an observation plane,
the first block, the second block, and the third block are arranged in the first direction, and
the light control element comprises a first light controller overlapping the first block, a second light controller overlapping the second block, and a third light controller overlapping the third block.

14. The display device according to claim 13, wherein:
the display portion comprises a plurality of pixel groups, each of which is identical to the pixel group; and
the pixel groups adjacent to each other in the first direction are shifted in the second direction.

15. The display device according to claim 13, wherein:
the display portion comprises a red sub-pixel, a green sub-pixel, and a blue sub-pixel, as the sub-pixels which display images of a same viewpoint; and
the red sub-pixel, the green sub-pixel, and the blue sub-pixel are arranged in a direction in which the light controller extends.

16. The display device according to claim 15, wherein the red sub-pixel, the green sub-pixel, and the blue sub-pixel are located in a first row, a fourth row, and a seventh row of the pixel group, respectively.

* * * * *